US007475067B2

(12) United States Patent
Clary et al.

(10) Patent No.: US 7,475,067 B2
(45) Date of Patent: Jan. 6, 2009

(54) WEB PAGE PERFORMANCE SCORING

(75) Inventors: Robert D. Clary, Howardsville, VA (US); Jim Davidson, Reston, VA (US); Judson Valeski, Boulder, CO (US)

(73) Assignee: AOL LLC, Dulles, VA (US)

( * ) Notice: Subject to any disclaimer, the term of this patent is extended or adjusted under 35 U.S.C. 154(b) by 549 days.

(21) Appl. No.: 10/887,956

(22) Filed: Jul. 9, 2004

(65) Prior Publication Data

US 2007/0299869 A1  Dec. 27, 2007

(51) Int. Cl.
 *G06F 17/30* (2006.01)
(52) U.S. Cl. .................. 707/5; 707/102; 707/104.1
(58) Field of Classification Search .............. 707/1, 707/102, 104.1, 5, 100; 715/234, 760
See application file for complete search history.

(56) References Cited

U.S. PATENT DOCUMENTS

| | | | |
|---|---|---|---|
| 6,226,648 B1 | 5/2001 | Appleman et al. | |
| 6,360,235 B1 | 3/2002 | Tilt et al. | |
| 6,785,671 B1 * | 8/2004 | Bailey et al. | 707/3 |
| 7,257,577 B2 * | 8/2007 | Fagin et al. | 707/7 |
| 7,260,573 B1 * | 8/2007 | Jeh et al. | 707/7 |
| 2002/0023141 A1 | 2/2002 | Yen et al. | |
| 2002/0188717 A1 | 12/2002 | Mushlin et al. | |
| 2003/0105604 A1 | 6/2003 | Ash et al. | |
| 2003/0128233 A1 | 7/2003 | Kasriel et al. | |
| 2003/0130982 A1 | 7/2003 | Kasriel et al. | |
| 2003/0131106 A1 | 7/2003 | Kasriel et al. | |
| 2005/0060168 A1 * | 3/2005 | Murashige et al. | 705/1 |
| 2005/0060297 A1 * | 3/2005 | Najork | 707/3 |
| 2006/0287907 A1 * | 12/2006 | Kim | 705/10 |

OTHER PUBLICATIONS

Topaz; The Complete Solution For Application Performance Management; Mercuryinteractive.com; 2002; 384-BR-TPZFACT3.
Web Insight on Demand; Vividence eXpress; Vividence.com; 2003.
Joachims, Thorsten, et al.; WebWatcher: Machine Learning and Hypertext; Carnegie Mellon University; May 29, 1995.
Maritz, Mindability; Thompson Lightstone & Company 2003.
NetRaker Clickstream; Analyze and visualize navigation patterns; netRakerCorporation; 1998-2002.
NetRaker Experience Evaluator; quickly gather customer insights; netRakerCorporation; 1998-2002.
NetRaker Index; Complete site evaluation from your customer's perspective; netRakerCorporation; 1998-2002.
NetRaker Experience Recorder; observe and react toyour customer's; netRakerCorporation; 1998-2002.
NetRaker Products; netRakerCorporation; 1998-2002.
Ghita. B.V.; Furnell, S,M.; Lines, B.M.; Ifeachor, E.C.; Endpoint study of internet paths and web page transfers; Campus-Wide Information Systems; vol. 20, No. 3 p. 90-7, 2003.
Yun Fu; Cherkasova, L.; Wenting Tang; Vahdat, A.; EtE: passive end-to-end Internet service performance monitoring; Proceedings of he General Track; 2002 USENIX Annual Technical Conf. p. 115-30;2002.
Edwards, H.K., et al.; Title: A methodology and implementation for analytic modeling in electronic commerce applications; Electronic Commerce Technologies; 2nd Int'l Symposium, vol. 2040, 6 148-57; 2001.

* cited by examiner

*Primary Examiner*—Cheryl Lewis
(74) *Attorney, Agent, or Firm*—Michael A. Glenn; Glenn Patent Group

(57) ABSTRACT

A browser-based tool is provided that loads a Webpage, accesses the document object model (DOM) of the page, collects information about the page structure and parses the page, determines through the use of heuristics such factors as how much text is found on the page and the like, produces statistical breakdown of the page, and calculates a score based on performance of the page. Key to the operation of the invention is the ability to observe operation of the Webpage as it actually loads in real time, scoring the page for several of various performance factors, and producing a combined score for the various factors.

16 Claims, 20 Drawing Sheets

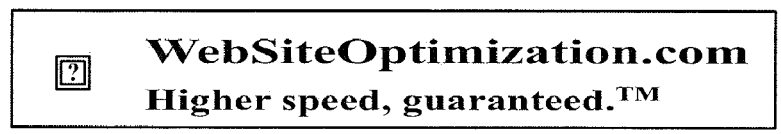

WebSiteOptimization.com
Higher speed, guaranteed.™

**Home   Sitemap   Publications   Services
Contact   About** home > services > analyze > results

Web site analysis report

| URL: | slashdot.org |
|---|---|
| Title: | Slashdot: News for nerds, stuff that matters |
| Date: | Report run on Thu May 22 17:22:32 EDT 2003 |

Diagnosis

Global Statistics

11 —

| Total HTTP Requests: | 39 |
|---|---|
| Total Size: | 80797 bytes |

Object Size Totals

15 —

| Object type | Size (bytes) |
|---|---|
| HTML: | 45177 |
| Images: | 33326 |
| Javascript: | 3349 |
| CSS: | 0 |
| Multimedia: | 0 |
| Other: | 0 |

External Objects

12 —

| External Objects | QTY |
|---|---|
| Total Images: | 22 |
| Total Scripts: | 1 |

*FIG. 1A*
*(Prior Art)*

Connect Times

| Connect Rate | Connect Time |
|---|---|
| 14.4K | 43.84 seconds |
| 28.8K | 21.92 seconds |
| 33.6K | 18.79 seconds |
| 56K | 11.27 seconds |
| ISDN 128K | 4.93 seconds |
| T1 1.44Mbps | 0.43 seconds |

Note that these download times are based on the full connection rate with no latency. Actual download times will be slower, your mileage may vary.

Page Objects

*— 14*

| QTY | SIZE | TYPE | URL |
|---|---|---|---|
| 1 | 45177 | HTML | http://slashdot.org |
| 2 | 4756 | IMG | http://images.slashdot.org/topics/topictech2.gif |
| 1 | 3473 | IMG | http://images.slashdot.org/title.gif |
| 1 | 3034 | IMG | http://images.slashdot.org/topics/topicsecurity.gif |
| 1 | 2294 | SCRIPT | http://pagead.googlesyndication.com/ca/show_ads.js |
| 1 | 2141 | IMG | http://images.slashdot.org/topics/topicslashback.gif |
| 1 | 2039 | IMG | http://images.slashdot.org/topics/topicinternet.gif |
| 1 | 1988 | IMG | http://images.slashdot.org/topics/topiclinux.gif |
| 1 | 1848 | IMG | http://images.slashdot.org/topics/topiccaldera.gif |
| 1 | 1735 | IMG | http://images.slashdot.org/topics/topiced.gif |
| 1 | 1716 | IMG | http://images.slashdot.org/topics/topicspam.gif |
| 1 | 1564 | IMG | http://images.slashdot.org/topics/topicmatrix.gif |
| 1 | 1476 | IMG | http://images.slashdot.org/topics/topicmovies.gif |
| 1 | 1457 | IMG | http://images.slashdot.org/topics/topicbusiness.gif |
| 1 | 1298 | IMG | http://images.slashdot.org/topics/topichumor.gif |
| 1 | 1186 | IMG | http://images.slashdot.org/topics/topicspace.gif |
| 1 | 1185 | IMG | http://images.slashdot.org/topics/topichardware.gif |
| 1 | 1083 | IMG | http://images.slashdot.org/topics/topicscience.gif |
| 2 | 1045 | IMG | http://images.slashdot.org/topics/tpoicwireless.gif |
| 13 | 122 | IMG | http://images.slashdot.org/slc.gif |
| 1 | 53 | IMG | http://images.slashdot.org/greendot.gif |
| 1 | 43 | IMG | http://images.slashdot.org/pix.gif |
| 1 | 42 | IMG | http://images2.slashdot.org/Slashdot/pc.gif?index,105363855 |
| 1 | 42 | IMG | http://images.slashdot.org/banner/goog5025en.gif?105363855 |
| 39^ | 80797 | | Total (^unique objects) |

* CSS alternate stylesheets may be referenced in the HTML but are not actually downloaded until they are needed and are therefore not included in the total page size.

Analysis and Recommendations

- TOTAL_OBJECTS - Warning! Danger Will Robinson! The total number of objects on this page is 39- consider reducing this to a more reasonable number. Combine, refine, and optimize. Replace graphic rollovers with CSS rollovers to speed display and minimize HTTP requests.
- TOTAL_IMAGES - Warning! Danger Will Robinson! The total number of images on this page is 22, consider reducing this to a more reasonable number. Combine, refine, and optimize your graphics. Replace graphic rollovers with CSS rollovers to speed display and minimize HTTP requests.
- TOTAL_SIZE - Caution. The total size of this page is 80797 bytes, which will load in over 8 seconds on a 56Kbps modem. Consider reducing total page size to less than 30K to achieve sub eight second response times on 56K connections. Be sure to provide feedback for pages over 30K by layering your design to display useful content within the first two seconds. Consider optimizing your site with *Speed Up Your Site* or contacting us about our optimization services.
- TOTAL_SCRIPT - Congratulations, the total number of external script files on this page is 1; External scripts are less reliably cached than CSS

FIG. 1C
*(Prior Art)*

Report for http://slashdot.org/
- Totals

Total Score 2.9 — 21

Score Details — 22

Incremental Layout Score 2.6 — 23

Latency Score 2.3 — 24

25 — Download Score 2.3

| Version | First Visit | Second Visit |
|---|---|---|
| Original | 4.1 | 2.5 |
| Optimized | 4 | 2.4 |

26 —

| Measurement | Value |
|---|---|
| Document Size | 11983 |
| Document Size (Cached) | 0 |
| Total Size | 67606 |
| Total Files (#) | 22 |
| Text (bytes) | 0 |
| Text Cached (bytes) | 0 |
| Binary (bytes) | 55623 |
| Binary Cached (bytes) | 55623 |
| Domains | 2 |
| Whitespace (bytes) | 993 |
| Cookies (bytes) | 0 |
| Depth (DOM) | 24 |

27 —

| Measurement | Count | Size (bytes) | Cached Size (bytes) |
|---|---|---|---|
| table | 42 | 0 | 0 |
| tr | 52 | 0 | 0 |
| td | 65 | 0 | 0 |
| font | 114 | 0 | 0 |
| script-inline | 3 | 1117 | 0 |
| img | 36 | 55623 | 55623 |
| img-spacer | 3 | 138 | 138 |
| script | 0 | 0 | 0 |
| css | 0 | 0 | 0 |
| applet | 0 | 0 | 0 |
| embed | 0 | 0 | 0 |
| style-inline | 0 | 0 | 0 |

*FIG. 2A*

• HEAD 28
Details of HEAD Tag

| Measurement | Count | Size (bytes) | Cached Size (bytes) |
|---|---|---|---|
| script | 0 | 0 | 0 |
| css | 0 | 0 | 0 |

• Body 29
Details of Body Tag

| Measurement | Count | Size (bytes) | Cached Size (bytes) |
|---|---|---|---|
| table | 42 | 0 | 0 |
| tr | 52 | 0 | 0 |
| td | 65 | 0 | 0 |
| font | 114 | 0 | 0 |
| script-inline | 3 | 1117 | 0 |
| img | 36 | 55623 | 55623 |
| img-spacer | 3 | 138 | 138 |

Details of child elements of BODY Tag

TABLE size: 1925

CENTER size: 16769 30

TABLE size: 83931

| key | http://image2.slashdot.org/Slashdot/pc.gif?indcx, 1053639114483 |
|---|---|
| dataSize | 42 |
| fetchCount | 3 |
| lastFetched | Thu May 22 2003 17:32:21 GMT-0400 (Eastern Daylight Time) |
| lastModified | Thu May 22 2003 17:31:57 GMT-0400 (Eastern Daylight Time) |
| expirationTime | Sun Aug 10 2003 14:59:44 GMT-0400 (Eastern Daylight Time) |
| responseHead | HTTP/1.1 200 OK<br>Date: Thu, 22 May 2003 21:32:14 GMT<br>Server: Apache/1.3.26 (unix)<br>Last-Modified: Wed, 14 Mar 2001 22:53:51 GMT<br>Etag: "234004-2a-3aaff67f"<br>Accept-Ranges: bytes<br>Content-Length: 42<br>Content-Type: image/gif |

*FIG. 2B*

| key | http://images.slashdot.org/banner/pmks0307en.gif?1053639114492 |
|---|---|
| dataSize | 15074 |
| fetchCount | 3 |
| lastModified | Thu May 22 2003 17:32:21 GMT-0400 (Eastern Daylight Time) |
| expirationTime | Thu May 22 2003 17:32:02 GMT-0400 (Eastern Daylight Time) |
| responseHead | Thu May 29 2003 17:31:54 GMT-0400 (Eastern Daylight Time) |
| | HTTP/1.1 200 OK<br>Date: Thu, 22 May 2003 21:32:12 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:12 GMT<br>Last-Modified: Sat, 26 Oct 2002 16:13:07 GMT<br>Etag: "if8a28-3ae2-c60faac0"<br>Accept-Ranges: bytes<br>Content-Length: 15074<br>Content-Type: image/gif |

| key | http://images.slashdot.org/title.gif |
|---|---|
| dataSize | 3473 |
| fetchCount | 26 |
| lastFetched | Thu May 22 2003 17:32:21 GMT-0400 (Eastern Daylight Time) |
| lastModified | Thu May 22 2003 17:31:57 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:15 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:15 GMT<br>Last-Modified: Thu, 22 May 2003 05:07:00 GMT<br>Etag: "1d01da-d91-b6d5a500"<br>Accept-Ranges: bytes<br>Content-Length: 3473<br>Content-Type: image/gif |

*FIG. 2C*

| key | http://images.slashdot.org/topics/topicmatrix.gif |
|---|---|
| dataSize | 1564 |
| fetchCount | 25 |
| lastFetched | Thu May 22 2003 17:32:21 GMT-0400 (Eastern Daylight Time) |
| lastModified | Thu May 22 2003 17:32:00 GMT-0400 (Eastern Daylight Time) |
| expirationTime | Thu May 29 2003 17:31:54 GMT-0400 (Eastern Daylight Time) |
| lastFetched | Thu May 22 2003 17:32:21 GMT-0400 (Eastern Daylight Time) |
| lastModified | Thu May 22 2003 17:32:00 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:18 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:18 GMT<br>Last-Modified: Thu, 22 May 2003 05:07:00 GMT<br>Etag: "1000c8-61c-b6d5a500"<br>Accept-Ranges: bytes<br>Content-Length: 1564<br>Content-Type: image/gif |

| key | http://images.slashdot.org/topics/topicslashback.gif |
|---|---|
| dataSize | 2141 |
| fetchCount | 21 |
| lastFetched | Thu May 22 2003 17:32:21 GMT-0400 (Eastern Daylight Time) |
| lastModified | Thu May 22 2003 17:32:02 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:19 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:19 GMT<br>Last-Modified: Thu, 22 May 2003 05:07:00 GMT<br>Etag: "100112-85d-b6d5a500"<br>Accept-Ranges: bytes<br>Content-Length: 2141<br>Content-Type: image/gif |

FIG. 2D

| key | http://images.slashdot.org/topics/topicmovies.gif |
|---|---|
| dataSize | 1476 |
| FetchCount | 22 |
| lastFetched | Thu May 22 2003 17:32:21 GMT-0400 (Eastern Daylight Time) |
| lastModified | Thu May 22 2003 17:32:03 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:20 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:20 GMT<br>Last-Modified: Thu, 22 May 2003 05:07:00 GMT<br>Etag: "38854b-5c4-b6d5a500"<br>Accept-Ranges: bytes<br>Content-Length: 1476<br>Content-Type: image/gif |

| key | http://images.slashdot.org/topics/topicwireless.gif |
|---|---|
| dataSize | 1045 |
| fetchCount | 25 |
| lastFetched | Thu May 22 2003 17:32:21 GMT-0400 (Eastern Daylight Time) |
| lastModified | Thu May 22 2003 17:32:04 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date:Thu, 22 May 2003 21:32:22 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:22 GMT<br>Last-Modified: Thu, 22 May 2003 05:07:00 GMT<br>Etag: "100082-415-b6d5a500"<br>Accept-Ranges: bytes<br>Content-Length: 1045<br>Content-Type: image/gif |

*FIG. 2E*

| key | http://images.slashdot.org/topics/topichardware.gif |
|---|---|
| dataSize | 1185 |
| fetchCount | 22 |
| lastFetched | Thu May 22 2003 17:32:21 GMT-0400 (Eastern Daylight Time) |
| lastModified | Thu May 22 2003 17:32:05 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:23 GMT<br>Server: Apache/2.0.45 (Unix) mod_ssl/2.0.45 Open SSL/0.9.6g<br>Cache-Control: max-age=604800<br>Expires: Thu, 29 May 2003 21:32:23 GMT<br>Last-Modified: Thu, 22 May 2003 05:07:00 GMT<br>Etag: "3e047b-4a1-b6d5a500"<br>Accept-Ranges: bytes<br>Content-Length: 1185<br>Content-Type: image/gif |

| key | http://images.slashdot.org/slc.gif |
|---|---|
| dataSize | 122 |
| fetchCount | 67 |
| lastFetched | Thu May 22 2003 17:32:21 GMT-0400 (Eastern Daylight Time) |
| lastModified | Thu May 22 2003 17:32:05 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:23 GMT<br>Server: Apache/2.0.45 (Unix) mod_ssl/2.0.45 Open SSL/0.9.6g<br>Cache-Control: max-age=604800<br>Expires: Thu, 29 May 2003 21:32:23 GMT<br>Last-Modified: Thu, 22 May 2003 05:07:00 GMT<br>Etag: "3e00d1-7a-b6d5a500"<br>Accept-Ranges: bytes<br>Content-Length: 122<br>Content-Type: image/gif |

*FIG. 2F*

| | |
|---|---|
| key | http://images.slashdot.org/topics/topicspace.gif |
| dataSize | 1186 |
| fetchCount | 6 |
| lastFetched | Thu May 22 2003 17:32:21 GMT-0400 (Eastern Daylight Time) |
| lastModified | Thu May 22 2003 17:32:06 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:25 GMT<br>Server: Apache/2.0.45 (Unix) mod_ssl/2.0.45 Open SSL/0.9.6g<br>Cache-Control: max-age=604800<br>Expires: Thu, 29 May 2003 21:32:25 GMT<br>Last-Modified: Thu, 22 May 2003 05:07:00 GMT<br>Etag: "3e0513-4a2-b6d5a500"<br>Accept-Ranges: bytes<br>Content-Length: 1186<br>Content-Type: image/gif |

FIG. 2F
*(Continued)*

| key | http://images.slashdot.org/topics/topicsecurity.gif |
|---|---|
| dataSize | 3034 |
| fetchCount | 9 |
| lastFetched | Thu May 22 2003 17:32:21 GMT-0400 (Eastern Daylight Time) |
| lastModified | Thu May 22 2003 17:32:08 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:25 GMT<br>Server: Apache/2.0.45 (Unix) mod_ssl/2.0.45 Open SSL/0.9.6g<br>Cache-Control: max-age=604800<br>Expires: Thu, 29 May 2003 21:32:25 GMT<br>Last-Modified: Thu, 22 May 2003 05:07:00 GMT<br>Etag: "1000f0-bda-b6d5a500"<br>Accept-Ranges: bytes<br>Content-Length: 3034<br>Content-Type: image/gif |

| key | http://images.slashdot.org/topics/topiccaldera.gif |
|---|---|
| dataSize | 1848 |
| fetchCount | 8 |
| lastFetched | Thu May 22 2003 17:32:21 GMT-0400 (Eastern Daylight Time) |
| lastModified | Thu May 22 2003 17:32:09 GMT-0400 (Eastern Daylight Time) |
| expirationTime | Thu May 29 2003 17:31:55 GMT-0400 (Eastern Daylight Time) |
| responseHead | HTTP/1.1 200 OK<br>Date: Thu, 22 May 2003 21:32:27 GMT<br>Server: Apache/2.0.45 (Unix) mod_ssl/2.0.45 Open SSL/0.9.6g<br>Cache-Control: max-age=604800<br>Expires: Thu, 29 May 2003 21:32:27 GMT<br>Last-Modified: Thu, 22 May 2003 05:07:00 GMT<br>Etag: "3e00e1-738-b6d5a500"<br>Accept-Ranges: bytes<br>Content-Length: 1848<br>Content-Type: image/gif |

*FIG. 2G*

| key | http://images.slashdot.org/topics/topicbusiness.gif |
|---|---|
| dataSize | 1457 |
| fetchCount | 8 |
| lastFetched | Thu May 22 2003 17:32:21 GMT-0400 (Eastern Daylight Time) |
| lastModified | Thu May 22 2003 17:32:10 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:28 GMT<br>Server: Apache/2.0.45 (Unix) mod_ssl/2.0.45 Open SSL/0.9.6g<br>Cache-Control: max-age=604800<br>Expires: Thu, 29 May 2003 21:32:28 GMT<br>Last-Modified: Thu, 22 May 2003 05:07:00 GMT<br>Etag: "3e00d8-5b1-b6d5a500"<br>Accept-Ranges: bytes<br>Content-Length: 1457<br>Content-Type: image/gif |

| key | http://images.slashdot.org/topics/topiced.gif |
|---|---|
| dataSize | 1735 |
| fetchCount | 7 |
| lastFetched | Thu May 22 2003 17:32:21 GMT-0400 (Eastern Daylight Time) |
| lastModified | Thu May 22 2003 17:32:10 GMT-0400 (Eastern Daylight Time) |
| expirationTime | Thu May 29 2003 17:31:55 GMT-0400 (Eastern Daylight Time) |
| responseHead | HTTP/1.1 200 OK<br>Date: Thu, 22 May 2003 21:32:27 GMT<br>Server: Apache/2.0.45 (Unix) mod_ssl/2.0.45 Open SSL/0.9.6g<br>Cache-Control: max-age=604800<br>Expires: Thu, 29 May 2003 21:32:27 GMT<br>Last-Modified: Thu, 22 May 2003 05:07:00 GMT<br>Etag: "3889fc-6c7-b6d5a500"<br>Accept-Ranges: bytes<br>Content-Length: 1735<br>Content-Type: image/gif |

*FIG. 2H*

| key | http://images.slashdot.org/topics/topictech2.gif |
|---|---|
| dataSize | 4756 |
| fetchCount | 20 |
| lastFetched | Thu May 22 2003 17:32:21 GMT-0400 (Eastern Daylight Time) |
| lastModified | Thu May 22 2003 17:32:11 GMT-0400 (Eastern Daylight Time) |
| expirationTime | Thu May 29 2003 17:31:55 GMT-0400 (Eastern Daylight Time) |
| responseHead | HTTP/1.1 200 OK<br>Date: Thu, 22 May 2003 21:32:29 GMT<br>Server: Apache/2.0.45 (Unix) mod_ssl/2.0.45 Open SSL/0.9.6g<br>Cache-Control: max-age=604800<br>Expires: Thu, 29 May 2003 21:32:29 GMT<br>Last-Modified: Thu, 22 May 2003 05:07:00 GMT<br>Etag: "3e0244-1294-b6d5a500"<br>Accept-Ranges: bytes<br>Content-Length: 4756<br>Content-Type: image/gif |

| key | http://images.slashdot.org/topics/topicspam.gif |
|---|---|
| dataSize | 1716 |
| fetchCount | 7 |
| lastFetched | Thu May 22 2003 17:32:21 GMT-0400 (Eastern Daylight Time) |
| lastModified | Thu May 22 2003 17:32:12 GMT-0400 (Eastern Daylight Time) |
| expirationTime | Thu May 29 2003 17:31:55 GMT-0400 (Eastern Daylight Time) |
| responseHead | HTTP/1.1 200 OK<br>Date: Thu, 22 May 2003 21:32:28 GMT<br>Server: Apache/2.0.45 (Unix) mod_ssl/2.0.45 Open SSL/0.9.6g<br>Cache-Control: max-age=604800<br>Expires: Thu, 29 May 2003 21:32:28 GMT<br>Last-Modified: Thu, 22 May 2003 05:07:00 GMT<br>Etag: "388527-6b4-b6d5a500"<br>Accept-Ranges: bytes<br>Content-Length: 1716<br>Content-Type: image/gif |

*FIG. 21*

| key | http://images.slashdot.org/topics/topicinternet.gif |
|---|---|
| dataSize | 2039 |
| fetchCount | 13 |
| lastFetched | Thu May 22 2003 17:32:21 GMT-0400 (Eastern Daylight Time) |
| lastModified | Thu May 22 2003 17:32:13 GMT-0400 (Eastern Daylight Time) |
| expirationTime | Thu May 29 2003 17:31:56 GMT-0400 (Eastern Daylight Time) |
| responseHead | HTTP/1.1 200 OK<br>Date: Thu, 22 May 2003 21:32:31 GMT<br>Server: Apache/2.0.45 (Unix) mod_ssl/2.0.45 Open SSL/0.9.6g<br>Cache-Control: max-age=604800<br>Expires: Thu, 29 May 2003 21:32:31 GMT<br>Last-Modified: Thu, 22 May 2003 05:07:00 GMT<br>Etag: "100104-7f7-b6d5a500"<br>Accept-Ranges: bytes<br>Content-Length: 2039<br>Content-Type: image/gif |

*FIG. 2I*
*(Continued)*

| key | http://images.slashdot.org/topics/topicscience.gif |
|---|---|
| dataSize | 1083 |
| fetchCount | 10 |
| lastFetched | Thu May 22 2003 17:32:21 GMT-0400 (Eastern Daylight Time) |
| lastModified | Thu May 22 2003 17:32:14 GMT-0400 (Eastern Daylight Time) |
| expirationTime | Thu May 29 2003 17:31:56 GMT-0400 (Eastern Daylight Time) |
| responseHead | HTTP/1.1 200 OK<br>Date: Thu, 22 May 2003 21:32:32 GMT<br>Server: Apache/2.0.45 (Unix) mod_ssl/2.0.45 Open SSL/0.9.6g<br>Cache-Control: max-age=604800<br>Expires: Thu, 29 May 2003 21:32:32 GMT<br>Last-Modified: Thu, 22 May 2003 05:07:00 GMT<br>Etag: "1000bc-43b-b6d5a500"<br>Accept-Ranges: bytes<br>Content-Length: 1083<br>Content-Type: image/gif |

| key | http://images.slashdot.org/topics/topichumor.gif |
|---|---|
| dataSize | 1298 |
| fetchCount | 9 |
| lastFetched | Thu May 22 2003 17:32:21 GMT-0400 (Eastern Daylight Time) |
| lastModified | Thu May 22 2003 17:32:14 GMT-0400 (Eastern Daylight Time) |
| expirationTime | Thu May 29 2003 17:31:56 GMT-0400 (Eastern Daylight Time) |
| responseHead | HTTP/1.1 200 OK<br>Date: Thu, 22 May 2003 21:32:33 GMT<br>Server: Apache/2.0.45 (Unix) mod_ssl/2.0.45 Open SSL/0.9.6g<br>Cache-Control: max-age=604800<br>Expires: Thu, 29 May 2003 21:32:23 GMT<br>Last-Modified: Thu, 22 May 2003 05:07:00 GMT<br>Etag: "100100-512-b6d5a500"<br>Accept-Ranges: bytes<br>Content-Length: 1298<br>Content-Type: image/gif |

*FIG. 2J*

| key | http://images.slashdot.org/topics/topiclinux.gif |
|---|---|
| dataSize | 1988 |
| fetchCount | 14 |
| lastFetched | Thu May 22 2003 17:32:21 GMT-0400 (Eastern Daylight Time) |
| lastModified | Thu May 22 2003 17:32:15 GMT-0400 (Eastern Daylight Time) |
| expirationTime | Thu May 29 2003 17:31:56 GMT-0400 (Eastern Daylight Time) |
| responseHead | HTTP/1.1 200 OK<br>Date: Thu, 22 May 2003 21:32:34 GMT<br>Server: Apache/2.0.45 (Unix) mod_ssl/2.0.45 Open SSL/0.9.6g<br>Cache-Control: max-age=604800<br>Expires: Thu, 29 May 2003 21:32:34 GMT<br>Last-Modified: Thu, 22 May 2003 05:07:00 GMT<br>Etag: "3e0141-7c4-b6d5a500"<br>Accept-Ranges: bytes<br>Content-Length: 1988 |

*FIG. 2J*
*(Continued)*

| key | http://images.slashdot.org/pix.gif |
|---|---|
| dataSize | 43 |
| fetchCount | 8 |
| lastFetched | Thu May 22 2003 17:32:21 GMT-0400 (Eastern Daylight Time) |
| lastModified | Thu May 22 2003 17:32:15 GMT-0400 (Eastern Daylight Time) |
| expirationTime | Thu May 29 2003 17:31:58 GMT-0400 (Eastern Daylight Time) |
| responseHead | HTTP/1.1 200 OK<br>Date: Thu, 22 May 2003 21:32:34 GMT<br>Server: Apache/2.0.45 (Unix) mod_ssl/2.0.45 Open SSL/0.9.6g<br>Cache-Control: max-age=604800<br>Expires: Thu, 29 May 2003 21:32:34 GMT<br>Last-Modified: Thu, 22 May 2003 05:07:00 GMT<br>Etag: "3e0395-2b-b6d5a500"<br>Accept-Ranges: bytes<br>Content-Length: 43<br>Content-Type: image/gif |

| key | http://images.slashdot.org/greendot.gif |
|---|---|
| dataSize | 53 |
| fetchCount | 8 |
| lastFetched | Thu May 22 2003 17:32:21 GMT-0400 (Eastern Daylight Time) |
| lastModified | Thu May 22 2003 17:32:15 GMT-0400 (Eastern Daylight Time) |
| expirationTime | Thu May 29 2003 17:31:58 GMT-0400 (Eastern Daylight Time) |
| responseHead | HTTP/1.1 200 OK<br>Date: Thu, 22 May 2003 21:32:34 GMT<br>Server: Apache/2.0.45 (Unix) mod_ssl/2.0.45 Open SSL/0.9.6g<br>Cache-Control: max-age=604800<br>Expires: Thu, 29 May 2003 21:32:34 GMT<br>Last-Modified: Thu, 22 May 2003 05:07:00 GMT<br>Etag: "3e0141-7c4-b6d5a500"<br>Accept-Ranges: bytes<br>Content-Length: 1988<br>Content-Type: image/gif |

*FIG. 2K*

| key | http://images.slashdot.org/pix.gif |
|---|---|
| dataSize | 43 |
| fetchCount | 8 |
| lastFetched | Thu May 22 2003 17:32:21 GMT-0400 (Eastern Daylight Time) |
| lastModified | Thu May 22 2003 17:32:15 GMT-0400 (Eastern Daylight Time) |
| expirationTime | Thu May 29 2003 17:31:58 GMT-0400 (Eastern Daylight Time) |
| responseHead | HTTP/1.1 200 OK<br>Date: Thu, 22 May 2003 21:32:34 GMT<br>Server: Apache/2.0.45 (Unix) mod_ssl/2.0.45 Open SSL/0.9.6g<br>Cache-Control: max-age=604800<br>Expires: Thu, 29 May 2003 21:32:34 GMT<br>Last-Modified: Thu, 22 May 2003 05:07:00 GMT<br>Etag: "3e0395-2b-b6d5a500"<br>Accept-Ranges: bytes<br>Content-Length: 43<br>Content-Type: image/gif |

| key | http://images.slashdot.org/greendot.gif |
|---|---|
| dataSize | 53 |
| fetchCount | 8 |
| lastFetched | Thu May 22 2003 17:32:21 GMT-0400 (Eastern Daylight Time) |
| lastModified | Thu May 22 2003 17:32:16 GMT-0400 (Eastern Daylight Time) |
| expirationTime | Thu May 29 2003 17:31:58 GMT-0400 (Eastern Daylight Time) |
| responseHead | HTTP/1.1 200 OK<br>Date: Thu, 22 May 2003 21:32:33 GMT<br>Server: Apache/2.0.45 (Unix) mod_ssl/2.0.45 Open SSL/0.9.6g<br>Cache-Control: max-age=604800<br>Expires: Thu, 29 May 2003 21:32:33 GMT<br>Last-Modified: Thu, 22 May 2003 05:07:00 GMT<br>Etag: "3047-35-b6d5a500"<br>Accept-Ranges: bytes<br>Content-Length: 53<br>Content-Type: image/gif |

*FIG. 2L*

WEB PAGE PERFORMANCE SCORING

BACKGROUND OF THE INVENTION

1. Technical Field

The invention relates to a global telecommunications network. More particularly, the invention relates to a tool which analyses the content and structure of Web pages in real time and produces statistics and a performance score.

2. Description of the Prior Art

Web page performance affects the quality of experience for visitors, as well as server performance requirements. Web page performance depends upon many factors, such as the number and sizes of files required to display the page, the organization of the page, the result of any modifications to the page performed by script, and the configuration of the Web server(s) hosting the content.

WebSiteOptimization.com (see FIGS. 1a-1c) offers a product which is designated Web Page Analyzer-0.82. In using this product, a user enters a URL into a field within a Web page form to invoke a script that accesses the Web page associated with the entered URL. The script calculates Web page size 11, composition 12, and download time 13. The script also calculates the size of individual elements 14 and finds the total for each type of Web page component 15. Based on these page characteristics the script then offers advice 16 derived from anecdotal evidence and prior experience on how to improve page display time.

While determining file sizes can be accomplished relatively easily, determining the actual page content, the effects of the page structure, and server configuration is more difficult. Such determination typically requires reliance upon experimental data that depends upon the availability of network connections of varying speeds, as is the case with Web Page Analyzer-0.82.

It would be advantageous to provide a Web developer with the means to determine the relative performance of a Web page quickly, without having to rely upon experimental and anecdotal data that also depend upon the availability of network connections of varying speeds.

SUMMARY OF THE INVENTION

The invention comprises a tool that provides a Web developer with the means to determine the relative performance of a Web page quickly, in real time, without having to rely upon experimental and anecdotal data that is also dependent upon the availability of network connections of varying speeds. Deployment and use of this tool as a means of measuring and enforcing coding techniques which improve Web page performance can potentially provide a competitive advantage over competitor Web sites which do not optimize their content for performance.

The presently preferred embodiment of the invention comprises a browser-based tool that loads a Web page, accesses the document object model (DOM) of the page, collects information about the page structure and parses the page, determines through the use of heuristics such factors as how much text is found on the page and the like, produces a statistical breakdown of the page, and calculates a score based on performance of the page. Key to the operation of the invention is the ability to observe operation of the Web page as it actually loads in real time, scoring the page for several of various performance factors, and producing a combined score for the various factors. It is also possible to operate the invention such that it runs without user interaction and observation, for example on a server.

BRIEF DESCRIPTION OF THE DRAWINGS

FIGS. 1a-1c illustrate a Web page report according to the state of the art;

FIGS. 2a-2l illustrate a Web page report according to the invention; and

DETAILED DESCRIPTION OF THE INVENTION

Figure 3A:
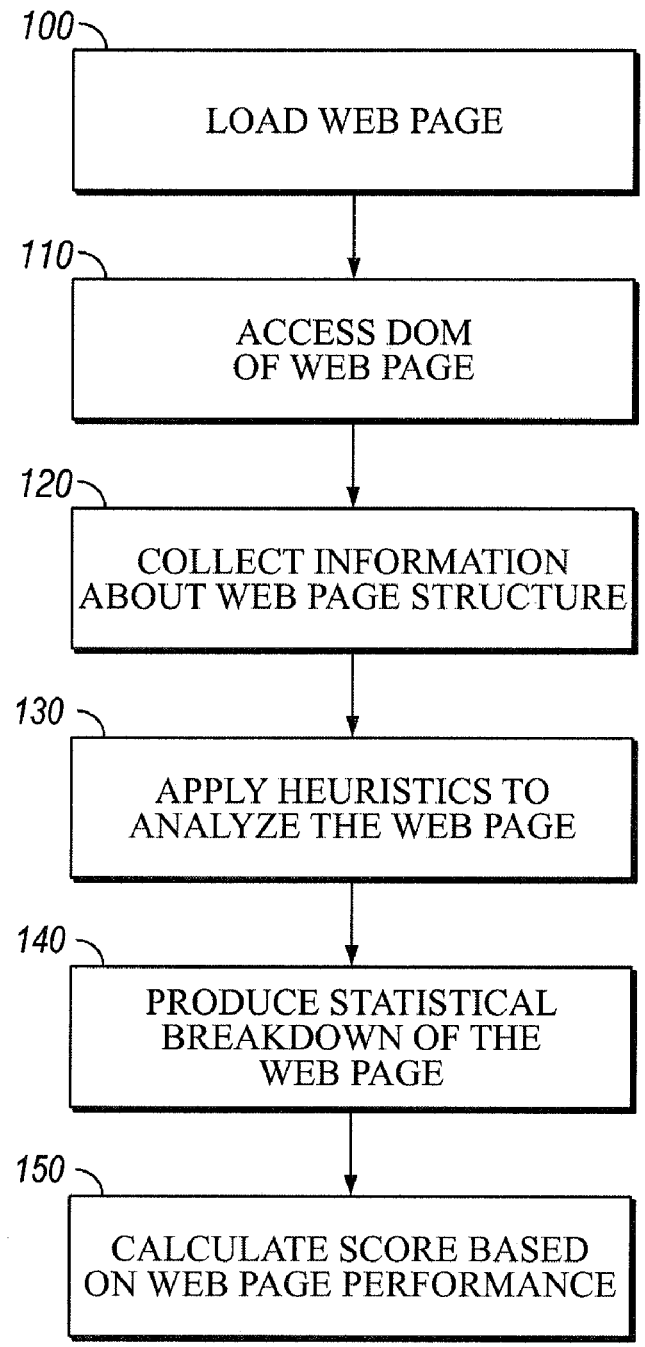
FIGS. 3a and 3b provide flow diagrams of a method for Web Page performance scoring using a browser-based tool according to the invention.

The invention comprises a tool that provides a Web developer with the means to determine the relative performance of a Web page quickly, in real time, without having to rely upon experimental and anecdotal data that is also dependent upon the availability of network connections of varying speeds. Deployment and use of this tool as a means of measuring and enforcing coding techniques which improve Web page performance can potentially provide a competitive advantage over competitor Websites which do not optimize their content for performance.

This tool can be used:

By individual Web developers to measure the relative performance of their Web pages interactively as they are being developed.

To report detailed statistics for a Web page.

As a process control measurement tool, which is run automatically, to determine performance scores for an entire Web site.

One embodiment of the Web page scoring tool disclosed herein provides a method of calculating a score which is a measure of the potential page load performance of the pages in a Web site for visitors with varying network performance characteristics. The tool can visit either a single page, or all pages linked from a page up to a specified depth while providing scores, overall statistics, and details for each included file.

Browser Configuration

The tool is designed to be run as a Web page using a browser, such as the Netscape Gecko-based browser. In the embodiment that comprises a Netscape Gecko-based browser, XPConnect is used to obtain information from the browser's cache regarding the files included by a Web page.

Operation

The tool operation occurs in two phases:

Collecting Information; and

Reporting.

The tool must first load the page or pages to be analyzed. Once the pages have been loaded, various reports can be generated for different network and user parameters without having to load the pages again.

Collecting Information

URL

Enter the URL of the Web page or site to be analyzed.

Depth

Choose a depth for the tool to follow links from the starting URL. A depth of 0 only loads and analyzes a single page. A depth of 1 analyzes the starting page and all pages linked to from the starting page.

Restrict Urls

Choose whether to restrict Urls. Restricting Urls prevents the tool from following any link which does not begin with the starting url. For example, if the starting Url is http://cnn.com/ and all links begin with http://www.cnn.com, then the tool does not follow the links if Restrict Url is checked.

Page Timeout

Choose a page timeout value. This value (in seconds) is the time the tool waits for a page to load before timing out and entering the pause state.

If it is desired to save the parameters in the form of a Url which can be reused in the form of a hyperlink, click Save Parameters, which creates a Url in the browser's location bar which has be saved.

Click Run to start loading and analyzing the Web page(s). One may Pause, Restart, or Stop the tool.

While it is running, the tool provides feedback on which page is currently being loaded and how many pages have been loaded so far, as well as how many pages remain to be loaded.

Reporting

Once the tool has finished loading all pages, the reports can be generated. The scores reported by the tool depend upon the values entered for the network and visitor parameters. It is possible to run the reports with differing parameters without having to re-load and re-analyze the pages each time.

Network Parameters

The actual page load performance of a Web page depends upon the visitor's network connection. The network parameters allow the user to calculate scores for the various types of visitor expected, such as dialup, Cable/DSL broadband, or Satellite broadband.

Bandwidth

Enter the bandwidth (in Bytes/Second) of the visitor's connection. A typical dialup visitor using a 56 kbps modem might have a bandwidth of 4096 Bytes/Second.

Compression

Enter the modem compression factor available to the visitor. A value of 1.0 means no compression, while a factor of 0.25 means the modem is able to compress text to 25% of its original size. Cable/DSL/Satellite broadband visitors typically have no compression and this value should be set to 1.0

DNS Lookup

Enter the time in seconds for the visitor's client to perform a DNS Lookup. Typical values for dialup users are on the order of 0.5 to 1.0 second; for Cable/DSL broadband on the order of 0.1 to 0.7 second; while Satellite broadband may see values in excess of 1.5 to two seconds.

Ping Latency

Enter the time in seconds for a ping to travel from the visitor's machine to the Web server and back. Typical values for a dialup user are on the order of 0.3 seconds; Cable/DSL broadband on the order of 0.1 seconds; while Satellite broadband may see values in excess of 1.5 seconds.

Important Note regarding Satellite Broadband

Due to the high latency implicit in Satellite broadband, Web pages which score well for dialup or Cable/DSL visitors may have an extremely poor score for Satellite broadband visitors. Approximately 30 million homes in the United States, as well as many others in other countries, do not have the option of using Cable or DSL broadband. Optimizing content for Satellite broadband visitors is an important consideration.

Visitor Parameters

The perceived performance of a Web page depends upon the user's behavior, e.g. how often the visitor returns to the page, how long does the visitor spend on page before clicking on a link, and how much time they consider it reasonable for a page to load.

Revisit Time

Enter the Revisit Time (in seconds) which measures how often a visitor returns to a page. This value is used to determine which files have unexpired cache entries when the visitor returns.

IntraPage Time

Enter the IntraPage Time (in seconds) which measures how long the visitor views a page before clicking on a link. This value is used to determine which files have unexpired cache entries when visiting links and is used to calculate a score for each page a visitor may click once the original page has loaded.

Perception Time

Enter the Perception Time (in seconds) which is used to measure the impatience of a visitor. A dialup user may be more tolerable of slow loading pages than a broadband visitor. A value of ten seconds for a dialup visitor is reasonable, while a value for a Cable/DSL broadband user may be much less.

Once all reporting parameters are entered, the user can either click on Report or Save Report to generate a report. To generate multiple reports on the same Web page(s) using different parameters, simply change the report parameters and click either Report or Save Report again.

The Report button dynamically creates a report in a new window. This option is quick and simple however it does not create a window that can be saved or forwarded to another user. To save a report in a format which can be saved locally or forwarded to another user, click the Save Report button. If the user clicks the Save Report button, a hyperlink appears in the message pane when the report is ready. Click on the link to open a new window which can be saved locally, forwarded in email, etc.

Interpreting Reports

Results are not absolute and must be interpreted. What works for one visitor may not work for another. For example, a dialup user with slow download speeds but relatively fast DNS Lookup and Ping times may find that a page which uses external files for scripts and CSS performs better than one without. On the other hand, a satellite broadband user with high download speeds and slow DNS Lookups and Ping times may find that a page which uses inline Script and CSS performs much better than the equivalent page using external files. Use these reports appropriately for the site in question and expected audience.

One of the most important influences of a Web page's performance is due to the caching configuration of the Web servers. Appropriately cached files do not require network traffic and improve both the experience of dialup, as well as satellite broadband users.

Parameters

The Parameters section of the report shows the values use to calculate the scores for the pages. Individual scores must be interpreted with these parameters in mind because the same page may have widely varying scores depending upon the parameters chosen.

Page

Each page report begins with Page: url Score value. The score is the value for the total First Visit score which assumes that no files have been cached and includes the time to download all content for the page.

Page Scores

The Page Scores table provides a breakdown of the scoring for a page by First/Second visit versus Blocking/Total.

The First Visit score assumes the visitor has not been to the site before or that their cache has been emptied. The Second Visit score assumes the visitor has previously visited the page and is revisiting after the time specified by the Revisit Time parameter. Comparing First Visit to Second Visit scores can indicate the effectiveness of the caching strategies in use on the site.

First and Second Visit scores are also broken down by Blocking versus Total. The Total Score is calculated from the time required to load all files required by the page. The Blocking score is calculated solely from files which may potentially block the display of a page until they have been downloaded. Blocking scores are intended to give a measure of how quickly the user experiences some feedback that the page is loading.

Notes

The Notes section contains comments which are intended to indicate that improvements may be possible with further investigation.

Summary Statistics

The Summary Statistics section contains summary information regarding the Web page such as if the document is compressed, the total size, number of domain lookups which may be required, etc.

File Cache Data

The File Cache Data section follows the Summary Statistics section and contains detailed cache information for each file included in the Web page. The HTTP Header is in red if the date reported by the Web server are more than an hour different from the time the page was analyzed. This can be useful in ensuring that the Web server's dates are properly set.

Links

If Depth was set to greater than 0, the Link Section of the report lists each link found on the page, along with an effective score which measures the time required to load the linked page, once the original page's content has been loaded. These scores can be used to determine the benefit of caching common files across a site.

Example Reports

The following reports were generated for CNN.com using a dialup 56K modem with a 40kbps connection using identical Visitor parameters (revisit after one day) while varying the Network parameters.

Dialup

Bandwidth 4096, Compression 0.25, DNS Lookup 1.0, Ping Latency 0.3

Web Page Scoring

Parameters

| | |
|---|---|
| Date Run | Tue Jul. 08, 2003 13:09:31 GMT-0400 (Eastern Daylight Time) |
| Bandwidth | 4096 |
| Compression | 0.25 |
| DNS Lookup Time | 1 |
| Ping Latency | 0.3 |
| Revisit Time | 86400 |
| IntraPage Time | 60 |
| User Perception Time | 10 |

Page: http://cnn.com/Score5.17

Page Scores

| | Blocking | Total |
|---|---|---|
| First Visit | 1.32 | 5.17 |
| Second Visit | 1.32 | 5.13 |

Notes
consider reducing redirections
consider reducing domain lookups
reduce whitespace
consider moving external scripts to inline or reducing domain lookups Summary Statistics

| | |
|---|---|
| Actual Load Time | 42.872 |
| Total Size | 173885 |
| Document Compressed | false |
| Redirects | 2 |
| Total Domains | 5 |
| Blocking Domains | 4 |
| Non Blocking Domains | 1 |
| Domains | cnn.com, www.cnn.com, i.cnn.net, ar.atwola.com, i.a.cnn.net |
| Extra Whitespace | 5149 |
| Inline Script Count | 6 |
| Inline Script Size | 1236 |
| External Script Count | 11 |
| External Script Size | 35033 |
| Inline Style Count | 1 |
| Inline Style Size | 110 |
| External Style Count | 3 |
| External Style Size | 25910 |
| DOM Depth | 26 |
| Table Depth | 5 | http://cnn.com/

| | |
|---|---|
| Size | 0 |
| Binary | false |
| Blocking | false |
| Redirected to | http://www.cnn.com/ |
| Modified | Tue Jul. 08, 2003 13:08:42 GMT-0400 (Eastern Daylight Time) |
| Expires | Wed Dec. 31, 1969 19:00:00 GMT-0500 (Eastern Standard Time) |
| HTTP Header | HTTP/1.1 302 Moved Temporarily<br>Server: Netscape-Enterprise/6.1 AOL<br>Date: Tue, 08 Jul. 2003 17:10:02 GMT<br>Location: http://www.cnn.com/<br>Content-Length: 0<br>Content-Type: text/html | http://www.cnn.com/

| | |
|---|---|
| Size | 56730 |
| Binary | false |
| Blocking | false |

-continued

| | |
|---|---|
| Redirected to | |
| Modified | Tue Jul. 08, 2003 13:08:52 GMT-0400 (Eastern Daylight Time) |
| Expires | Tue Jul. 08, 2003 13:09:42 GMT-0400 (Eastern Daylight Time) |
| HTTP Header | HTTP/1.1 200 OK<br>Server: Netscape-Enterprise/6.1 AOL<br>Date: Tue, 08 Jul. 2003 17:10:02 GMT<br>Last-Modified: Tue, 08 Jul 2003 17:10:00 GMT<br>Expires: Tue, 08 Jul. 2003 17:11:00 GMT<br>Cache-Control: private, max-age = 60<br>Content-Type: text/html | http://i.cnn.net/cnn/.element/ssi/css/1.0/main.css

| | |
|---|---|
| Size | 25910 |
| Binary | false |
| Blocking | true |
| Redirected to | |
| Modified | Tue Jul. 08, 2003 13:08:51 GMT-0400 (Eastern Daylight Time) |
| Expires | Tue Jul. 08, 2003 13:08:45 GMT-0400 (Eastern Daylight Time) |
| HTTP Header | HTTP/1.0 200 OK<br>Server: Netscape-Enterprise/6.1 AOL<br>Date: Wed, 25 Jun. 2003 15:05:51 GMT<br>Content-Type: text/css<br>Last-Modified: Wed, 25 Jun. 2003 15:04:29 GMT<br>Content-Length: 25910<br>Accept-Ranges: bytes<br>Age: 8543<br>X-Cache: HIT from i.cnn.net | http://i.cnn.net/cnn/.element/ssi/js/1.0/main.js

| | |
|---|---|
| Size | 21613 |
| Binary | false |
| Blocking | true |
| Redirected to | |
| Modified | Tue Jul. 08, 2003 13:08:54 GMT-0400 (Eastern Daylight Time) |
| Expires | Tue Jul. 08, 2003 13:08:52 GMT-0400 (Eastern Daylight Time) |
| HTTP Header | HTTP/1.0 200 OK<br>Server: Netscape-Enterprise/6.1 AOL<br>Date: Thu, 26 Jun. 2003 03:34:13 GMT<br>Content-Type: application/x-javascript<br>Last-Modified: Mon, 17 Mar. 2003 20:13:07 GMT<br>Content-Length: 21613<br>Accept-Ranges: bytes<br>Age: 787<br>X-Cache: HIT from i.cnn.net | http://ar.atwola.com/file/adsWrapper.js

| | |
|---|---|
| Size | 6039 |
| Binary | false |
| Blocking | true |
| Redirected to | |
| Modified | Tue Jul. 08, 2003 13:08:57 GMT-0400 (Eastern Daylight Time) |
| Expires | Wed Jul. 09, 2003 13:08:55 GMT-0400 (Eastern Daylight Time) |
| HTTP Header | HTTP/1.1 200 OK<br>Expires: Wed, 09 Jul. 2003 17:10:11 GMT<br>Date: Tue, 08 Jul. 2003 17:10:11 GMT<br>Content-Length: 6039<br>Content-Type: application/x-javascript | http://ar.atwola.com/file/adsPopup2.js

| | |
|---|---|
| Size | 5563 |
| Binary | false |
| Blocking | true |
| Redirected to | |
| Modified | Tue Jul. 08, 2003 13:08:58 GMT-0400 (Eastern Daylight Time) |
| Expires | Wed Jul. 09, 2003 13:08:57 GMT-0400 (Eastern Daylight Time) |
| HTTP Header | HTTP/1.1 200 OK<br>Expires: Wed, 09 Jul. 2003 17:10:14 GMT<br>Date: Tue, 08 Jul. 2003 17:10:14 GMT<br>Content-Length: 5563<br>Content-Type: application/x-javascript | http://i.cnn.net/cnn/images/1.gif

| | |
|---|---|
| Size | 43 |
| Binary | true |
| Blocking | false |
| Redirected to | |
| Modified | Tue Jul. 08, 2003 13:08:58 GMT-0400 (Eastern Daylight Time) |
| Expires | Tue Jul. 08, 2003 13:08:58 GMT-0400 (Eastern Daylight Time) |
| HTTP Header | HTTP/1.0 200 OK<br>Server: Netscape-Enterprise/6.1 AOL<br>Date: Fri, 20 Jun. 2003 15:36:44 GMT<br>Content-Type: image/gif<br>Last-Modified: Tue, 27 May 2003 19:00:10 GMT<br>Content-Length: 43<br>Accept-Ranges: bytes<br>Age: 2813<br>X-Cache: HIT from i.cnn.net | http://i.a.cnn.net/cnn/.element/img/1.0/logo/cnn.gif

| | |
|---|---|
| Size | 1910 |
| Binary | true |
| Blocking | false |
| Redirected to | |
| Modified | Tue Jul. 08, 2003 13:08:59 GMT-0400 (Eastern Daylight Time) |

-continued

| | |
|---|---|
| Expires | Tue Jul. 08, 2003 14:02:08 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:24 GMT |
| | Content-Length: 1910 |
| | Accept-Ranges: bytes |
| | Cache-Control: max-age = 3190 |
| | Date: Tue, 08 Jul. 2003 17:10:17 GMT |
| | Surrogate-Server: AkamaiGHost | http://ar.atwola.com/html/93103287/48441749/aol?SNM=HIDBFV&width=468&height=60&target=_top&TZ=240&TVAR=class%3Dus.low&CT=I

| | |
|---|---|
| Size | 402 |
| Binary | false |
| Blocking | false |
| Redirected to | |
| Modified | Tue Jul. 08, 2003 13:08:59 GMT-0400 (Eastern Daylight Time) |
| Expires | Wed Dec. 31, 1969 19:00:00 GMT-0500 (Eastern Standard Time) |
| HTTP Header | HTTP/1.1 200 OK |
| | Content-Type: text/html |
| | Pragma: no-cache |
| | Cache-Control: no-cache |
| | Expires: Tue, 08 Jul. 2003 17:10:15 GMT |
| | Date: Tue, 08 Jul. 2003 17:10:15 GMT |
| | Content-Length: 402 | http://i.a.cnn.net/cnn/.element/img/1.0/searchbar/bar.search.gif

| | |
|---|---|
| Size | 1107 |
| Binary | true |
| Blocking | false |
| Redirected to | |
| Modified | Tue Jul. 08, 2003 13:08:59 GMT-0400 (Eastern Daylight Time) |
| Expires | Tue Jul. 08, 2003 13:20:05 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:49:26 GMT |
| | Content-Length: 1107 |
| | Accept-Ranges: bytes |
| | Surrogate-Server: AkamaiGHost, AkamaiGHost |
| | Cache-Control: max-age = 667 |
| | Date: Tue, 08 Jul. 2003 17:10:17 GMT | http://i.a.cnn.net/cnn/.element/img/1.0/searchbar/bar.top.bevel.gif

| | |
|---|---|
| Size | 181 |
| Binary | true |
| Blocking | false |
| Redirected to | |
| Modified | Tue Jul. 08, 2003 13:09:00 GMT-0400 (Eastern Daylight Time) |
| Expires | Tue Jul. 08, 2003 13:34:50 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:49:26 GMT |
| | Content-Length: 181 |
| | Accept-Ranges: bytes |
| | Cache-Control: max-age = 1552 |
| | Date: Tue, 08 Jul. 2003 17:10:18 GMT |
| | Surrogate-Server: AkamaiGHost | http://i.a.cnn.net/cnn/.element/img/1.0/searchbar/bar.right.bevel.gif

| | |
|---|---|
| Size | 299 |
| Binary | true |
| Blocking | false |
| Redirected to | |
| Modified | Tue Jul. 08, 2003 13:09:00 GMT-0400 (Eastern Daylight Time) |
| Expires | Tue Jul. 08, 2003 13:33:30 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:49:26 GMT |
| | Content-Length: 299 |
| | Accept-Ranges: bytes |
| | Cache-Control: max-age = 1472 |
| | Date: Tue, 08 Jul. 2003 17:10:18 GMT |
| | Surrogate-Server: AkamaiGHost | http://i.a.cnn.net/cnn/.element/img/1.0/searchbar/bar.google.gif

| | |
|---|---|
| Size | 1273 |
| Binary | true |
| Blocking | false |
| Redirected to | |
| Modified | Tue Jul. 08, 2003 13:09:01 GMT-0400 (Eastern Daylight Time) |
| Expires | Tue Jul. 08, 2003 13:32:54 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:49:26 GMT |
| | Content-Length: 1273 |
| | Accept-Ranges: bytes |
| | Cache-Control: max-age = 1436 |
| | Date: Tue, 08 Jul. 2003 17:10:18 GMT |
| | Surrogate-Server: AkamaiGHost | http://i.a.cnn.net/cnn/.element/img/1.0/searchbar/bar.bottom.bevel.gif

| | |
|---|---|
| Size | 211 |
| Binary | true |
| Blocking | false |
| Redirected to | |
| Modified | Tue Jul. 08, 2003 13:09:01 GMT-0400 (Eastern Daylight Time) |
| Expires | Tue Jul. 08, 2003 13:15:13 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 211<br>Accept-Ranges: bytes<br>Cache-Control: max-age = 375<br>Date: Tue, 08 Jul. 2003 17:10:19 GMT<br>Surrogate-Server: AkamaiGHost | http://i.a.cnn.net/cnn/.element/img/1.0/main/nav_at_money.gif

| | |
|---|---|
| Size | 90 |
| Binary | true |
| Blocking | false |
| Redirected to | |
| Modified | Tue Jul. 08, 2003 13:09:03 GMT-0400 (Eastern Daylight Time) |
| Expires | Tue Jul. 08, 2003 13:31:57 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 90<br>Accept-Ranges: bytes<br>Cache-Control: max-age = 1379<br>Date: Tue, 08 Jul. 2003 17:10:20 GMT<br>Surrogate-Server: AkamaiGHost | http://i.a.cnn.net/cnn/.element/img/1.0/main/nav_at_si.gif

| | |
|---|---|
| Size | 82 |
| Binary | true |
| Blocking | false |
| Redirected to | |
| Modified | Tue Jul. 08, 2003 13:09:05 GMT-0400 (Eastern Daylight Time) |
| Expires | Tue Jul. 08, 2003 13:49:07 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 82<br>Accept-Ranges: bytes<br>Cache-Control: max-age = 2409<br>Date: Tue, 08 Jul. 2003 17:10:20 GMT<br>Surrogate-Server: AkamaiGHost | http://ar.atwola.con/html/93166917/48441749/aol?SNM=HIDBFV&width=120&height=90&target=_top&TZ=240&TVAR=class%3Dus.low&CT=I

| | |
|---|---|
| Size | 410 |
| Binary | false |
| Blocking | false |
| Redirected to | |
| Modified | Tue Jul. 08, 2003 13:09:00 GMT-0400 (Eastern Daylight Time) |
| Expires | Wed Dec. 31, 1969 19:00:00 GMT-0500 (Eastern Standard Time) |
| HTTP Header | HTTP/1.1 200 OK<br>Content-Type: text/html<br>Pragma: no-cache<br>Cache-Control: no-cache<br>Expires: Tue, 08 Jul. 2003 17:10:18 GMT<br>Date: Tue, 08 Jul. 2003 17:10:18 GMT<br>Content-Length: 410 | http://i.a.cnn.net/cnn/.element/img/1.0/sect/SEARCH/nav.search.gif

| | |
|---|---|
| Size | 1105 |
| Binary | true |
| Blocking | false |
| Redirected to | |
| Modified | Tue Jul. 08, 2003 13:09:06 GMT-0400 (Eastern Daylight Time) |
| Expires | Tue Jul. 08, 2003 13:15:27 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:28 GMT<br>Content-Length: 1105<br>Accept-Ranges: bytes<br>Cache-Control: max-age = 389<br>Date: Tue, 08 Jul. 2003 17:10:22 GMT<br>Surrogate-Server: AkamaiGHost | http://i.cnn.net/cnn/2003/images/07/08/top.miss.meridian.gif

| | |
|---|---|
| Size | 9497 |
| Binary | true |
| Blocking | false |
| Redirected to | |
| Modified | Tue Jul. 08, 2003 13:09:06 GMT-0400 (Eastern Daylight Time) |
| Expires | Tue Jul. 08, 2003 13:09:00 GMT-0400 (Eastern Daylight Time) |
| HTTP Header | HTTP/1.0 200 OK<br>Server: Netscape-Enterprise/6.1 AOL<br>Date: Tue, 08 Jul. 2003 16:12:13 GMT<br>Content-Type: image/gif<br>Last-Modified: Tue, 08 Jul. 2003 16:09:13 GMT<br>Content-Length: 9497<br>Accept-Ranges: bytes<br>Age: 2162<br>X-Cache: HIT from i.cnn.net | http://i.a.cnn.net/cnn/.element/img/1.0/
main/px_c00.gif

| | |
|---|---|
| Size | 43 |
| Binary | true |
| Blocking | false |
| Redirected to | |
| Modified | Tue Jul. 08, 2003 13:09:08 GMT-0400 (Eastern Daylight Time) |
| Expires | Tue Jul. 08, 2003 13:39:02 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 43<br>Accept-Ranges: bytes<br>Cache-Control: max-age = 1804<br>Date: Tue, 08 Jul. 2003 17:10:24 GMT<br>Surrogate-Server: AkamaiGHost | http://i.a.cnn.net/cnn/.element/img/1.0/main/user-
picks.gif

| | |
|---|---|
| Size | 151 |
| Binary | true |
| Blocking | false |
| Redirected to | |
| Modified | Tue Jul. 08, 2003 13:09:10 GMT-0400 (Eastern Daylight Time) |
| Expires | Tue Jul. 08, 2003 13:24:45 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 151<br>Accept-Ranges: bytes<br>Cache-Control: max-age = 947<br>Date: Tue, 08 Jul. 2003 17:10:25 GMT<br>Surrogate-Server: AkamaiGHost | http://i.cnn.net/cnn/.element/img/1.0/misc/premi-
um.gif

| | |
|---|---|
| Size | 74 |
| Binary | true |
| Blocking | false |
| Redirected to | |
| Modified | Tue Jul. 08, 2003 13:08:59 GMT-0400 (Eastern Daylight Time) |
| Expires | Tue Jul. 08, 2003 13:08:59 GMT-0400 (Eastern Daylight Time) |
| HTTP Header | HTTP/1.0 200 OK<br>Server: Netscape-Enterprise/6.1 AOL<br>Date: Thu, 26 Jun. 2003 03:06:00 GMT<br>Content-Type: image/gif<br>Last-Modified: Mon, 09 Jun. 2003 19:48:26 GMT<br>Content-Length: 74<br>Accept-Ranges: bytes<br>Age: 12938<br>X-Cache: HIT from i.cnn.net | http://i.a.cnn.net/cnn/.element/img/1.0/main/px_c-
cc.gif

| | |
|---|---|
| Size | 43 |
| Binary | true |
| Blocking | false |
| Redirected to | |
| Modified | Tue Jul. 08, 2003 13:09:10 GMT-0400 (Eastern Daylight Time) |
| Expires | Tue Jul. 08, 2003 13:28:53 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 43<br>Accept-Ranges: bytes<br>Cache-Control: max-age = 1195<br>Date: Tue, 08 Jul. 2003 17:10:26 GMT<br>Surrogate-Server: AkamaiGHost | http://i.a.cnn.net/cnn/.element/img/1.0/misc/audio.gif

| | |
|---|---|
| Size | 61 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:23:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:27 GMT<br>Content-Length: 61<br>Accept-Ranges: bytes<br>Cache-Control: max-age = 880<br>Date: Tue, 08 Jul. 2003 17:10:28 GMT<br>Surrogate-Server: AkamaiGHost | http://i.a.cnn.net/cnn/images/1.gif

| | |
|---|---|
| Size | 43 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:39:49 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Tue, 27 May 2003 19:00:10 GMT<br>Content-Length: 43<br>Accept-Ranges: bytes<br>Cache-Control: max-age = 1851<br>Date: Tue, 08 Jul. 2003 17:10:29 GMT<br>Surrogate-Server: AkamaiGHost | http://i.a.cnn.net/cnn/.element/img/1.0/main/more.video.blue.gif

| | |
|---|---|
| Size | 153 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:25:02 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 153<br>Accept-Ranges: bytes<br>Cache-Control: max-age = 964<br>Date: Tue, 08 Jul. 2003 17:10:30 GMT<br>Surrogate-Server: AkamaiGHost | http://i.a.cnn.net/cnn/images/icons/premium.gif

| | |
|---|---|
| Size | 74 |
| Binary | true |
| Blocking | false |
| Redirected to | |
| Modified | Tue Jul. 08, 2003 13:09:12 GMT-0400 (Eastern Daylight Time) |
| Expires | Tue Jul. 08, 2003 13:34:35 GMT-0400 (Eastern Daylight Time) |
| HTTP Header | HTTP/1.0 200 OK<br>Last-Modified: Wed, 13 Mar. 2002 21:19:25 GMT<br>Accept-Ranges: bytes<br>Server: Netscape-Enterprise/6.1 AOL<br>Content-Type: image/gif<br>Content-Length: 74<br>Surrogate-server: AkamaiGHost, AkamaiGHost, AkamaiGHost<br>Cache-Control: max-age = 1537<br>Expires: Tue, 08 Jul. 2003 17:36:07 GMT<br>Date: Tue, 08 Jul. 2003 17:10:30 GMT | http://i.a.cnn.net/cnn/video/iraq/2003/07/08/ja.baghd.at.night.vs.cnn.jpg

| | |
|---|---|
| Size | 5388 |
| Binary | true |
| Blocking | false |
| Redirected to | |
| Modified | Tue Jul. 08, 2003 13:09:13 GMT-0400 (Eastern Daylight Time) |
| Expires | Tue Jul. 08, 2003 13:24:19 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 05:48:35 GMT<br>Content-Length: 5388<br>Accept-Ranges: bytes<br>Cache-Control: max-age = 921<br>Date: Tue, 08 Jul. 2003 17:10:30 GMT<br>Surrogate-Server: AkamaiGHost | http://i.a.cnn.net/cnn/.element/img/1.0/main/super-links/health.gif

| | |
|---|---|
| Size | 161 |
| Binary | true |
| Blocking | false |
| Redirected to | |
| Modified | Tue Jul. 08, 2003 13:09:13 GMT-0400 (Eastern Daylight Time) |
| Expires | Tue Jul. 08, 2003 13:32:16 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 161<br>Accept-Ranges: bytes<br>Surrogate-Server: AkamaiGHost, AkamaiGHost<br>Cache-Control: max-age = 1398<br>Date: Tue, 08 Jul. 2003 17:10:30 GMT | http://i.a.cnn.net/cnn/2003/HEALTH/07/08/otsc.gupta/tz.gupta.jpg

| | |
|---|---|
| Size | 3702 |
| Binary | true |
| Blocking | false |
| Redirected to | |
| Modified | Tue Jul. 08, 2003 13:09:14 GMT-0400 (Eastern Daylight Time) |
| Expires | Tue Jul. 08, 2003 13:34:28 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 13:26:21 GMT<br>Content-Length: 3702<br>Accept-Ranges: bytes<br>Surrogate-Server: AkamaiGHost, AkamaiGHost<br>Cache-Control: max-age = 1530<br>Date: Tue, 08 Jul. 2003 17:10:32 GMT | http://i.a.cnn.net/cnn/.element/img/1.0/main/at_cnnmoney.gif

| | |
|---|---|
| Size | 559 |
| Binary | true |
| Blocking | false |
| Redirected to | |
| Modified | Tue Jul. 08, 2003 13:09:14 GMT-0400 (Eastern Daylight Time) |
| Expires | Tue Jul. 08, 2003 13:23:25 GMT-0400 (Eastern Daylight Time) |
| HTTP Header | HTTP/1.0 200 OK |

-continued

Server: Netscape-Enterprise/6.1 AOL
Content-Type: image/gif
Last-Modified: Mon, 09 Jun. 2003
19:48:24 GMT
Content-Length: 559
Accept-Ranges: bytes
Cache-Control: max-age = 867
Date: Tue, 08 Jul. 2003 17:10:32 GMT
Surrogate-Server: AkamaiGHost http://i.a.cnn.net/cnn/.element/img/1.0/main/business.news.blue.gif

| | |
|---|---|
| Size | 169 |
| Binary | true |
| Blocking | false |
| Redirected to | |
| Modified | Tue Jul. 08, 2003 13:09:15 GMT-0400 (Eastern Daylight Time) |
| Expires | Tue Jul. 08, 2003 14:00:21 GMT-0400 (Eastern Daylight Time) |
| HTTP Header | HTTP/1.0 200 OK
Server: Netscape-Enterprise/6.1 AOL
Content-Type: image/gif
Last-Modified: Mon, 09 Jun. 2003
19:48:25 GMT
Content-Length: 169
Accept-Ranges: bytes
Cache-Control: max-age = 3083
Date: Tue, 08 Jul. 2003 17:10:33 GMT
Surrogate-Server: AkamaiGHost | http://ar.atwola.com/image/93103306/aol

| | |
|---|---|
| Size | 0 |
| Binary | true |
| Blocking | false |
| Redirected to | http://ar.atwola.com/content/B0/0/H7pTL2Luf0_kw3xmlj8W1sns8a9RRNke8_SAqLzKBa609jmULHVa8jgFKtiL69KXTPCmjMkYOvM5C_xF31KNjRb-UvMSjKyxE7A6B3LIHANk$/aol |
| Modified | Tue Jul. 08, 2003 13:09:00 GMT-0400 (Eastern Daylight Time) |
| Expires | Wed Dec. 31, 1969 19:00:00 GMT-0500 (Eastern Standard Time) |
| HTTP Header | HTTP/1.1 302 Found
Pragma: no-cache
Cache-Control: no-cache
Expires: Tue, 08 Jul. 2003 17:10:16 GMT
Location:
http://ar.atwola.com/content/B0/0/H7pTL2Luf0_kw3xmlj8W1sns8a9RRNke8_SAqLzKBa609jmULHVa8jgFKtiL69KXTPCmjMkYOvM5C_xF31KNjRb-UvMSjKyxE7A6B3LIHANk$/aol
P3P: CP = "CUR TAI PSA UNI COM NAV STA NOI OUR"
Date: Tue, 08 Jul. 2003 17:10:16 GMT
Content-Length: 0 | http://ar.atwola.com/content/B0/0/H7pTL2Luf0_kw3xmlj8W1sns8a9RRNke8_SAqLzKBa609jmULHVa8jgFKtiL69KXTPCmjMkYOvM5C_xF3lKNjRbUvMSjKyxE7A6B3LIHAN k$/aol

| | |
|---|---|
| Size | 696 |
| Binary | false |
| Blocking | false |
| Redirected to | |
| Modified | Tue Jul. 08, 2003 13:09:05 GMT-0400 (Eastern Daylight Time) |
| Expires | Fri Jul. 11, 2003 13:09:00 GMT-0400 (Eastern Daylight Time) |
| HTTP Header | HTTP/1.1 200 OK
Last-Modified: Sat, 05 Jul. 2003
17:10:20 GMT
Expires: Fri, 11 Jul. 2003 17:10:20 GMT
Date: Tue, 08 Jul. 2003 17:10:20 GMT
Content-Length: 696
Content-Type: image/gif | http://i.cnn.net/cnn/.element/img/1.0/main/arrow_down.gif

| | |
|---|---|
| Size | 70 |
| Binary | true |
| Blocking | false |
| Redirected to | |
| Modified | Tue Jul. 08, 2003 13:09:02 GMT-0400 (Eastern Daylight Time) |

-continued

| | |
|---|---|
| Expires | Tue Jul. 08, 2003 13:09:02 GMT-0400 (Eastern Daylight Time) |
| HTTP Header | HTTP/1.0 200 OK |
| | Server: Netscape-Enterprise/6.1 AOL |
| | Date: Thu, 26 Jun. 2003 03:01:27 GMT |
| | Content-Type: image/gif |
| | Last-Modified: Mon, 09 Jun. 2003 19:48:24 GMT |
| | Content-Length: 70 |
| | Accept-Ranges: bytes |
| | Age: 1724 |
| | X-Cache: HIT from i.cnn.net | http://i.cnn.net/cnn/.element/img/1.0/main/arrow_up.gif

| | |
|---|---|
| Size | 70 |
| Binary | true |
| Blocking | false |
| Redirected to | |
| Modified | Tue Jul. 08, 2003 13:09:06 GMT-0400 (Eastern Daylight Time) |
| Expires | Tue Jul. 08, 2003 13:09:06 GMT-0400 (Eastern Daylight Time) |
| HTTP Header | HTTP/1.0 200 OK |
| | Server: Netscape-Enterprise/6.1 AOL |
| | Date: Sat, 21 Jun. 2003 05:12:01 GMT |
| | Content-Type: image/gif |
| | Last-Modified: Mon, 09 Jun. 2003 19:48:24 GMT |
| | Content-Length: 70 |
| | Accept-Ranges: bytes |
| | Age: 8558 |
| | X-Cache: HIT from i.cnn.net | http://i.cnn.net/cnn/.element/img/1.0/main/ftn.breaking.alerts.gif

| | |
|---|---|
| Size | 1919 |
| Binary | true |
| Blocking | false |
| Redirected to | |
| Modified | Tue Jul. 08, 2003 13:09:15 GMT-0400 (Eastern Daylight Time) |
| Expires | Tue Jul. 08, 2003 13:36:45 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:26 GMT |
| | Content-Length: 1919 |
| | Accept-Ranges: bytes |
| | Cache-Control: max-age = 1667 |
| | Date: Tue, 08 Jul. 2003 17:10:33 GMT |
| | Surrogate-Server: AkamaiGHost | http://i.a.cnn.net/cnn/.element/img/1.0/main/ftn.345x32.try.timeMay03.gif

| | |
|---|---|
| Size | 2035 |
| Binary | true |
| Blocking | false |
| Redirected to | |
| Modified | Tue Jul. 08, 2003 13:09:16 GMT-0400 (Eastern Daylight Time) |
| Expires | Tue Jul. 08, 2003 13:18:33 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 07 Jul. 2003 20:55:34 GMT |
| | Content-Length: 2035 |
| | Accept-Ranges: bytes |
| | Cache-Control: max-age = 575 |
| | Date: Tue, 08 Jul. 2003 17:10:33 GMT |
| | Surrogate-Server: AkamaiGHost | http://i.a.cnn.net/cnn/.element/img/1.0/main/super-links/reports.gif

| | |
|---|---|
| Size | 170 |
| Binary | true |
| Blocking | false |
| Redirected to | |
| Modified | Tue Jul. 08, 2003 13:09:16 GMT-0400 (Eastern Daylight Time) |
| Expires | Tue Jul. 08, 2003 13:57:16 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:25 GMT |
| | Content-Length: 170 |
| | Accept-Ranges: bytes |
| | Surrogate-Server: AkamaiGHost, AkamaiGHost |
| | Cache-Control: max-age = 2898 |
| | Date: Tue, 08 Jul. 2003 17:10:34 GMT | http://i.a.cnn.net/cnn/images/programming.boxes/tz.machu.picchu.jpg

| | |
|---|---|
| Size | 1050 |
| Binary | true |
| Blocking | false |
| Redirected to | |
| Modified | Tue Jul. 08, 2003 13:09:16 GMT-0400 (Eastern Daylight Time) |
| Expires | Tue Jul. 08, 2003 13:19:50 GMT-0400 (Eastern Daylight Time) |
| HTTP Header | HTTP/1.0 200 OK |
| | Server: Netscape-Enterprise/6.1 AOL |
| | Content-Type: image/jpeg |
| | Last-Modified: Mon, 07 Jul. 2003 20:35:45 GMT |
| | Content-Length: 1050 |
| | Accept-Ranges: bytes |
| | Cache-Control: max-age = 652 |
| | Date: Tue, 08 Jul. 2003 17:10:35 GMT |
| | Surrogate-Server: AkamaiGHost | http://i.a.cnn.net/cnn/.element/img/1.0/main/super-links/technology.gif

| | |
|---|---|
| Size | 186 |
| Binary | true |
| Blocking | false |
| Redirected to | |
| Modified | Tue Jul. 08, 2003 13:09:17 GMT-0400 (Eastern Daylight Time) |
| Expires | Tue Jul. 08, 2003 13:22:12 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun, 2003 19:48:26 GMT<br>Content-Length: 186<br>Accept-Ranges: bytes<br>Cache-Control: max-age = 794<br>Date: Tue, 08 Jul. 2003 17:10:35 GMT<br>Surrogate-Server: AkamaiGHost | http://i.a.cnn.net/cnn/2003/TECH/ptech/07/08/pop-sci.ul.labs/tz.ul.lab.cnn.jpg

| | |
|---|---|
| Size | 1258 |
| Binary | true |
| Blocking | false |
| Redirected to | |
| Modified | Tue Jul. 08, 2003 13:09:17 GMT-0400 (Eastern Daylight Time) |
| Expires | Tue Jul. 08, 2003 13:25:42 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 13:47:23 GMT<br>Content-Length: 1258<br>Accept-Ranges: bytes<br>Cache-Control: max-age = 1004<br>Date: Tue, 08 Jul. 2003 17:10:35 GMT<br>Surrogate-Server: AkamaiGHost | http://i.a.cnn.net/cnn/.element/img/1.0/main/us.gif

| | |
|---|---|
| Size | 352 |
| Binary | true |
| Blocking | false |
| Redirected to | |
| Modified | Tue Jul. 08, 2003 13:09:17 GMT-0400 (Eastern Daylight Time) |
| Expires | Tue Jul. 08, 2003 13:25:22 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 352<br>Accept-Ranges: bytes<br>Cache-Control: max-age = 984<br>Date: Tue, 08 Jul. 2003 17:10:35 GMT<br>Surrogate-Server: AkamaiGHost | http://i.a.cnn.net/cnn/.element/img/1.0/main/world.gif

| | |
|---|---|
| Size | 456 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:57:41 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 456<br>Accept-Ranges: bytes<br>Cache-Control: max-age = 2923<br>Date: Tue, 08 Jul. 2003 17:10:36 GMT<br>Surrogate-Server: AkamaiGHost | http://i.cnn.net/cnn/.element/img/1.0/misc/icon.external.links.gif

| | |
|---|---|
| Size | 104 |
| Binary | true |
| Blocking | false |
| Redirected to | |
| Modified | Tue Jul. 08, 2003 13:09:09 GMT-0400 (Eastern Daylight Time) |
| Expires | Tue Jul. 08, 2003 13:09:09 GMT-0400 (Eastern Daylight Time) |
| HTTP Header | HTTP/1.0 200 OK<br>Server: Netscape-Enterprise/6.1 AOL<br>Date: Fri, 20 Jun. 2003 15:39:46 GMT<br>Content-Type: image/gif<br>Last-Modified: Mon, 09 Jun. 2003 19:48:26 GMT<br>Content-Length: 104<br>Accept-Ranges: bytes<br>Age: 11403<br>X-Cache: HIT from i.cnn.net | http://i.a.cnn.net/cnn/.element/img/1.0/main/technology.gif

| | |
|---|---|
| Size | 731 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:32:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 731<br>Accept-Ranges: bytes<br>Cache-Control: max-age = 1420<br>Date: Tue, 08 Jul. 2003 17:10:36 GMT<br>Surrogate-Server: AkamaiGHost | http://i.a.cnn.net/cnn/.element/img/1.0/main/entertainment.gif

| | |
|---|---|
| Size | 661 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:42:43 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 661<br>Accept-Ranges: bytes<br>Cache-Control: max-age = 2025<br>Date: Tue, 08 Jul. 2003 17:10:36 GMT<br>Surrogate-Server: AkamaiGHost | http://i.a.cnn.net/cnn/.element/img/1.0/main/politics.gif

| | |
|---|---|
| Size | 484 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:47:26 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 484<br>Accept-Ranges: bytes<br>Cache-Control: max-age = 2308<br>Date: Tue, 08 Jul. 2003 17:10:36 GMT<br>Surrogate-Server: AkamaiGHost | http://i.a.cnn.net/cnn/.element/img/1.0/main/law.gif

| | |
|---|---|
| Size | 394 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:59:39 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 394<br>Accept-Ranges: bytes<br>Cache-Control: max-age = 3041<br>Date: Tue, 08 Jul. 2003 17:10:37 GMT<br>Surrogate-Server: AkamaiGHost | http://i.a.cnn.net/cnn/.element/img/1.0/main/health.gif

| | |
|---|---|
| Size | 448 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:40:46 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 448<br>Accept-Ranges: bytes<br>Cache-Control: max-age = 1908<br>Date: Tue, 08 Jul. 2003 17:10:37 GMT<br>Surrogate-Server: AkamaiGHost | http://i.a.cnn.net/cnn/.element/img/1.0/main/space.gif

| | |
|---|---|
| Size | 914 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:28:53 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 914<br>Accept-Ranges: bytes<br>Surrogate-Server: AkamaiGHost, AkamaiGHost<br>Cache-Control: max-age = 1195<br>Date: Tue, 08 Jul. 2003 17:10:37 GMT | http://i.a.cnn.net/cnn/.element/img/1.0/main/travel.gif

| | |
|---|---|
| Size | 442 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:37:01 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 442<br>Accept-Ranges: bytes<br>Surrogate-Server: AkamaiGHost, AkamaiGHost<br>Cache-Control: max-age = 1683<br>Date: Tue, 08 Jul. 2003 17:10:37 GMT | http://i.a.cnn.net/cnn/.element/img/1.0/main/education.gif

| | |
|---|---|
| Size | 536 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:16:18 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 536<br>Accept-Ranges: bytes<br>Cache-Control: max-age = 440<br>Date: Tue, 08 Jul. 2003 17:10:38 GMT<br>Surrogate-Server: AkamaiGHost | http://i.a.cnn.net/cnn/.element/img/1.0/main/sports.gif

| | |
|---|---|
| Size | 452 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 14:02:04 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 452<br>Accept-Ranges: bytes<br>Cache-Control: max-age = 3186<br>Date: Tue, 08 Jul. 2003 17:10:38 GMT<br>Surrogate-Server: AkamaiGHost | http://i.a.cnn.net/cnn/.element/img/1.0/main/business.gif

| | |
|---|---|
| Size | 515 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:19:24 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 515<br>Accept-Ranges: bytes<br>Surrogate-Server: AkamaiGHost, AkamaiGHost<br>Cache-Control: max-age = 626<br>Date: Tue, 08 Jul. 2003 17:10:38 GMT | http://i.a.cnn.net/cnn/.element/img/1.0/misc/diagonal.gif

| | |
|---|---|
| Size | 86 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:43:03 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:27 GMT<br>Content-Length: 86<br>Accept-Ranges: bytes<br>Cache-Control: max-age = 2045<br>Date: Tue, 08 Jul. 2003 17:10:38 GMT<br>Surrogate-Server: AkamaiGHost | http://i.a.cnn.net/cnn/.element/img/1.0/main/tv.schedule.gif

| | |
|---|---|
| Size | 161 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:19:12 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 161<br>Accept-Ranges: bytes<br>Cache-Control: max-age = 614<br>Date: Tue, 08 Jul. 2003 17:10:39 GMT<br>Surrogate-Server: AkamaiGHost | http://i.cnn.net/cnn/CNN/Programs/includes/showbox/images/paula.zahn.gif

| | |
|---|---|
| Size | 3762 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:09:09 GMT-0400 (Eastern Daylight Time) |
| HTTP Header | HTTP/1.0 200 OK<br>Server: Netscape-Enterprise/6.1 AOL<br>Date: Thu, 22 May 2003 22:29:24 GMT<br>Content-Type: image/gif |

-continued

| | |
|---|---|
| | Last-Modified: Sun, 18 Aug. 2002 18:22:27 GMT |
| | Content-Length: 3762 |
| | Accept-Ranges: bytes |
| | Age: 67768 |
| | X-Cache: HIT from i.cnn.net | http://i.a.cnn.net/cnn/.element/img/1.0/main/super-links/us.gif

| | |
|---|---|
| Size | 145 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:23:54 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:26 GMT |
| | Content-Length: 145 |
| | Accept-Ranges: bytes |
| | Cache-Control: max-age = 896 |
| | Date: Tue, 08 Jul. 2003 17:10:39 GMT |
| | Surrogate-Server: AkamaiGHost | http://i.a.cnn.net/cnn/2003/US/07/08/nyt.kristof/tz.blair.jpg

| | |
|---|---|
| Size | 4091 |
| Binary | true |
| Blocking | false |
| Redirected to | |
| Modified | Tue Jul. 08, 2003 13:09:22 GMT-0400 (Eastern Daylight Time) |
| Expires | Tue Jul. 08, 2003 13:56:56 GMT-0400 (Eastern Daylight Time) |
| HTTP Header | HTTP/1.0 200 OK |
| | Server: Netscape-Enterprise/6.1 AOL |
| | Content-Type: image/jpeg |
| | Last-Modified: Tue, 08 Jul. 2003 15:48:13 GMT |
| | Content-Length: 4091 |
| | Accept-Ranges: bytes |
| | Cache-Control: max-age=2878 |
| | Date: Tue, 08 Jul. 2003 17:10:39 GMT |
| | Surrogate-Server: AkamaiGHost | http://i.a.cnn.net/cnn/.element/img/1.0/main/super-links/offbeat.gif

| | |
|---|---|
| Size | 171 |
| Binary | true |
| Blocking | false |
| Redirected to | |
| Modified | Tue Jul. 08, 2003 13:09:22 GMT-0400 (Eastern Daylight Time) |

-continued

| | |
|---|---|
| Expires | Tue Jul. 08, 2003 13:42:20 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:26 GMT |
| | Content-Length: 171 |
| | Accept-Ranges: bytes |
| | Cache-Control: max-age = 2002 |
| | Date: Tue, 08 Jul. 2003 17:10:39 GMT |
| | Surrogate-Server: AkamaiGHost | http://i.a.cnn.net/cnn/2003/US/Southwest/07/08/offbeat.editor.fired/tz.caddyshack.jpg

| | |
|---|---|
| Size | 2064 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:53:26 GMT-0400 (Eastern Daylight Time) |
| HTTP Header | HTTP/1.0 200 OK |
| | Server: Netscape-Enterprise/6.1 AOL |
| | Content-Type: image/jpeg |
| | Last-Modified: Tue, 08 Jul. 2003 16:37:42 GMT |
| | Content-Length: 2064 |
| | Accept-Ranges: bytes |
| | Surrogate-Server: AkamaiGHost, AkamaiGHost |
| | Cache-Control: max-age = 2667 |
| | Date: Tue, 08 Jul. 2003 17:10:40 GMT | http://i.a.cnn.net/cnn/.element/img/1.0/main/quick-vote.no.sponsor.gif

| | |
|---|---|
| Size | 1437 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:50:00 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:26 GMT |
| | Content-Length: 1437 |
| | Accept-Ranges: bytes |
| | Surrogate-Server: AkamaiGHost, AkamaiGHost |
| | Cache-Control: max-age = 2461 |
| | Date: Tue, 08 Jul. 2003 17:10:41 GMT | http://i.a.cnn.net/cnn/.element/img/1.0/main/icon_external.gif

| | |
|---|---|
| Size | 104 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:32:52 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 104<br>Accept-Ranges: bytes<br>Cache-Control: max-age = 1433<br>Date: Tue, 08 Jul. 2003 17:10:41 GMT<br>Surrogate-Server: AkamaiGHost | http://i.a.cnn.net/cnn/.element/img/1.0/main/partner_time.gif

| | |
|---|---|
| Size | 439 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:48:52 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 439<br>Accept-Ranges: bytes<br>Cache-Control: max-age = 2393<br>Date: Tue, 08 Jul. 2003 17:10:42 GMT<br>Surrogate-Server: AkamaiGHost | http://i.a.cnn.net/cnn/.element/img/1.0/main/partner_si.gif

| | |
|---|---|
| Size | 973 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:25:00 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 973<br>Accept-Ranges: bytes<br>Cache-Control: max-age = 961<br>Date: Tue, 08 Jul. 2003 17:10:42 GMT<br>Surrogate-Server: AkamaiGHost | http://i.a.cnn.net/cnn/.element/img/1.0/main/partner_fortune.gif

| | |
|---|---|
| Size | 938 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:25:29 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 938<br>Accept-Ranges: bytes<br>Surrogate-Server: AkamaiGHost, AkamaiGHost, AkamaiGHost<br>Cache-Control: max-age = 990<br>Date: Tue, 08 Jul. 2003 17:10:42 GMT | http://i.a.cnn.net/cnn/.element/img/1.0/sect/SEARCH/dotted.line.gif

| | |
|---|---|
| Size | 69 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:23:14 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:28 GMT<br>Content-Length: 69<br>Accept-Ranges: bytes<br>Cache-Control: max-age = 855<br>Date: Tue, 08 Jul. 2003 17:10:42 GMT<br>Surrogate-Server: AkamaiGHost | http://i.a.cnn.net/cnn/.element/img/1.0/misc/icon.external.links.gif

| | |
|---|---|
| Size | 104 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:50:35 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 104<br>Accept-Ranges: bytes<br>Cache-Control: max-age = 2496<br>Date: Tue, 08 Jul. 2003 17:10:43 GMT<br>Surrogate-Server: AkamaiGHost | http://ar.atwola.com/html/93103308/48441749/
aol?SNM=HIDBFV&width=88&height=31&
target=_top&TZ=240&TVAR=class%3Dus.low&CT=I

| | |
|---|---|
| Size | 377 |
| Binary | false |
| Blocking | false |
| Redirected to | |
| Modified | Tue Jul. 08, 2003 13:09:01 GMT-0400 (Eastern Daylight Time) |
| Expires | Wed Dec. 31, 1969 19:00:00 GMT-0500 (Eastern Standard Time) |
| HTTP Header | HTTP/1.1 200 OK |
| | Content-Type: text/html |
| | Pragma: no-cache |
| | Cache-Control: no-cache |
| | Expires: Tue, 08 Jul. 2003 17:10:16 GMT |
| | Date: Tue, 08 Jul. 2003 17:10:16 GMT |
| | Content-Length: 377 | http://i.a.cnn.net/cnn/.element/img/1.0/main/icon_premium.gif

| | |
|---|---|
| Size | 74 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:37:32 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:24 GMT |
| | Content-Length: 74 |
| | Accept-Ranges: bytes |
| | Cache-Control: max-age = 1713 |
| | Date: Tue, 08 Jul. 2003 17:10:43 GMT |
| | Surrogate-Server: AkamaiGHost | http://ar.atwola.com/html/93137910/48441749/
aol?SNM=HIDBFV&width=101&height=1&
target=_top&TZ=240&TVAR=class%3Dus.low&
CT=J&hw=docw

| | |
|---|---|
| Size | 267 |
| Binary | False |
| Blocking | true |
| Redirected to | |
| Modified | Tue Jul. 08, 2003 13:09:02 GMT-0400 (Eastern Daylight Time) |
| Expires | Wed Dec. 31, 1969 19:00:00 GMT-0500 (Eastern Standard Time) |
| HTTP Header | HTTP/1.1 200 OK |
| | Content-Type: application/x-javascript |
| | Pragma: no-cache |
| | Cache-Control: no-cache |
| | Expires: Tue, 08 Jul. 2003 17:10:19 GMT |

-continued

| | |
|---|---|
| | Date: Tue, 08 Jul. 2003 17:10:19 GMT |
| | Content-Length: 267 | http://ar.atwola.com/file/adsEnd.js

| | |
|---|---|
| Size | 1551 |
| Binary | false |
| Blocking | true |
| Redirected to | |
| Modified | Tue Jul. 08, 2003 13:09:11 GMT-0400 (Eastern Daylight Time) |
| Expires | Wed Jul. 09, 2003 13:09:02 GMT-0400 (Eastern Daylight Time) |
| HTTP Header | HTTP/1.1 200 OK |
| | Expires: Wed, 09 Jul. 2003 17:10:27 GMT |
| | Date: Tue, 08 Jul. 2003 17:10:27 GMT |
| | Content-Length: 1551 |
| | Content-Type: application/x-javascript | http://www.cnn.com/cookie.crumb

| | |
|---|---|
| Size | 43 |
| Binary | true |
| Blocking | false |
| Redirected to | |
| Modified | Tue Jul. 08, 2003 13:09:14 GMT-0400 (Eastern Daylight Time) |
| Expires | Wed Dec. 31, 1969 19:00:00 GMT-0500 (Eastern Standard Time) |
| HTTP Header | HTTP/1.1 200 OK |
| | Server: Netscape-Enterprise/6.1 AOL |
| | Date: Tue, 08 Jul. 2003 17:10:31 GMT |
| | Content-Length: 43 |
| | Content-Type: image/gif |
| URL | Total Score |

Links

Cable

Bandwidth 40960, Compression 1.0, DNS Lookup 1.0, Ping Latency 0.1

Web Page Scoring

Parameters

| | |
|---|---|
| Date Run | Tue Jul. 08, 2003 13:11:13 GMT-0400 (Eastern Daylight Time) |
| Bandwidth | 40960 |
| Compression | 1 |
| DNS Lookup Time | 1 |
| Ping Latency | 0.1 |
| Revisit Time | 86400 |
| IntraPage Time | 60 |
| User Perception Time | 10 |

Page: http://cnn.com/Score2

Page Scores

|  | Blocking | Total |
|---|---|---|
| First Visit | 0.76 | 2 |
| Second Visit | 0.76 | 1.98 |

Notes
consider reducing redirections
consider reducing domain lookups
consider moving external scripts to inline or reducing domain lookups
consider moving external css to inline or reducing domain lookups
first visit: blocking latency dominates size
second visit: blocking latency dominates size

Summary Statistics

| | |
|---|---|
| Actual Load Time | 42.872 |
| Total Size | 173885 |
| Document Compressed | false |
| Redirects | 2 |
| Total Domains | 5 |
| Blocking Domains | 4 |
| Non Blocking Domains | 1 |
| Domains | cnn.com, www.cnn.com, i.cnn.net, ar.atwola.com, i.a.cnn.net |
| Extra Whitespace | 5149 |
| Inline Script Count | 6 |
| Inline Script Size | 1236 |
| External Script Count | 11 |
| External Script Size | 35033 |
| Inline Style Count | 1 |
| Inline Style Size | 110 |
| External Style Count | 3 |
| External Style Size | 25910 |
| DOM Depth | 26 |
| Table Depth | 5 | http://cnn.com/

| | |
|---|---|
| Size | 0 |
| Binary | false |
| Blocking | false |
| Redirected to | http://www.cnn.com/ |
| Modified | Tue Jul. 08, 2003 13:08:42 GMT-0400 (Eastern Daylight Time) |
| Expires | Wed Dec. 31, 1969 19:00:00 GMT-0500 (Eastern Standard Time) |
| HTTP Header | HTTP/1.1 302 Moved Temporarily |
| | Server: Netscape-Enterprise/6.1 AOL |
| | Date: Tue, 08 Jul. 2003 17:10:02 GMT |
| | Location: http://www.cnn.com/ |
| | Content-Length: 0 |
| | Content-Type: text/html | http://www.cnn.com/

| | |
|---|---|
| Size | 56730 |
| Binary | false |
| Blocking | false |
| Redirected to | |
| Modified | Tue Jul. 08, 2003 13:08:52 GMT-0400 (Eastern Daylight Time) |
| Expires | Tue Jul. 08, 2003 13:09:42 GMT-0400 (Eastern Daylight Time) |
| HTTP Header | HTTP/1.1 200 OK |
| | Server: Netscape-Enterprise/6.1 AOL |
| | Date: Tue, 08 Jul. 2003 17:10:02 GMT |
| | Last-Modified: Tue, 08 Jul. 2003 17:10:00 GMT |
| | Expires: Tue, 08 Jul. 2003 17:11:00 GMT |
| | Cache-Control: private, max-age = 60 |
| | Content-Type: text/html | http://i.cnn.net/cnn/.element/ssi/css/1.0/main.css

| | |
|---|---|
| Size | 25910 |
| Binary | false |
| Blocking | true |
| Redirected to | |
| Modified | Tue Jul. 08, 2003 13:08:51 GMT-0400 (Eastern Daylight Time) |
| Expires | Tue Jul. 08, 2003 13:08:45 GMT-0400 (Eastern Daylight Time) |
| HTTP Header | HTTP/1.0 200 OK |
| | Server: Netscape-Enterprise/6.1 AOL |
| | Date: Wed, 25 Jun. 2003 15:05:51 GMT |
| | Content-Type: text/css |
| | Last-Modified: Wed, 25 Jun. 2003 15:04:29 GMT |
| | Content-Length: 25910 |
| | Accept-Ranges: bytes |
| | Age: 8543 |
| | X-Cache: HIT from i.cnn.net | http://i.cnn.net/cnn/.element/ssi/js/1.0/main.js

| | |
|---|---|
| Size | 21613 |
| Binary | false |
| Blocking | true |
| Redirected to | |
| Modified | Tue Jul. 08, 2003 13:08:54 GMT-0400 (Eastern Daylight Time) |
| Expires | Tue Jul. 08, 2003 13:08:52 GMT-0400 (Eastern Daylight Time) |
| HTTP Header | HTTP/1.0 200 OK |
| | Server: Netscape-Enterprise/6.1 AOL |
| | Date: Thu, 26 Jun. 2003 03:34:13 GMT |
| | Content-Type: application/x-javascript |
| | Last-Modified: Mon, 17 Mar. 2003 20:13:07 GMT |
| | Content-Length: 21613 |
| | Accept-Ranges: bytes |
| | Age: 787 |
| | X-Cache: HIT from i.cnn.net | http://ar.atwola.com/file/adsWrapper.js

| | |
|---|---|
| Size | 6039 |
| Binary | false |
| Blocking | true |
| Redirected to | |
| Modified | Tue Jul. 08, 2003 13:08:57 GMT-0400 (Eastern Daylight Time) |
| Expires | Wed Jul. 09, 2003 13:08:55 GMT-0400 (Eastern Daylight Time) |
| HTTP Header | HTTP/1.1 200 OK<br>Expires: Wed, 09 Jul. 2003 17:10:11 GMT<br>Date: Tue, 08 Jul. 2003 17:10:11 GMT<br>Content-Length: 6039<br>Content-Type: application/x-javascript | http://ar.atwola.com/file/adsPopup2.js

| | |
|---|---|
| Size | 5563 |
| Binary | false |
| Blocking | true |
| Redirected to | |
| Modified | Tue Jul. 08, 2003 13:08:58 GMT-0400 (Eastern Daylight Time) |
| Expires | Wed Jul. 09, 2003 13:08:57 GMT-0400 (Eastern Daylight Time) |
| HTTP Header | HTTP/1.1 200 OK<br>Expires: Wed, 09 Jul. 2003 17:10:14 GMT<br>Date: Tue, 08 Jul. 2003 17:10:14 GMT<br>Content-Length: 5563<br>Content-Type: application/x-javascript | http://i.cnn.net/cnn/images/1.gif

| | |
|---|---|
| Size | 43 |
| Binary | true |
| Blocking | false |
| Redirected to | |
| Modified | Tue Jul. 08, 2003 13:08:58 GMT-0400 (Eastern Daylight Time) |
| Expires | Tue Jul. 08, 2003 13:08:58 GMT-0400 (Eastern Daylight Time) |
| HTTP Header | HTTP/1.0 200 OK<br>Server: Netscape-Enterprise/6.1 AOL<br>Date: Fri, 20 Jun. 2003 15:36:44 GMT<br>Content-Type: image/gif<br>Last-Modified: Tue, 27 May 2003 19:00:10 GMT<br>Content-Length: 43<br>Accept-Ranges: bytes<br>Age: 2813<br>X-Cache: HIT from i.cnn.net | http://i.a.cnn.net/cnn/.element/img/1.0/logo/cnn.gif

| | |
|---|---|
| Size | 1910 |
| Binary | true |

-continued

| | |
|---|---|
| Blocking | false |
| Redirected to | |
| Modified | Tue Jul. 08, 2003 13:08:59 GMT-0400 (Eastern Daylight Time) |
| Expires | Tue Jul. 08, 2003 14:02:08 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 1910<br>Accept-Ranges: bytes<br>Cache-Control: max-age = 3190<br>Date: Tue, 08 Jul. 2003 17:10:17 GMT<br>Surrogate-Server: AkamaiGHost | http://ar.atwola.com/html/93103287/48441749/aol?SNM=HIDBFV&width=468&height=60&target=_top&TZ=240&TVAR=class%3Dus.low&CT=I

| | |
|---|---|
| Size | 402 |
| Binary | false |
| Blocking | false |
| Redirected to | |
| Modified | Tue Jul. 08, 2003 13:08:59 GMT-0400 (Eastern Daylight Time) |
| Expires | Wed Dec. 31, 1969 19:00:00 GMT-0500 (Eastern Standard Time) |
| HTTP Header | HTTP/1.1 200 OK<br>Content-Type: text/html<br>Pragma: no-cache<br>Cache-Control: no-cache<br>Expires: Tue, 08 Jul. 2003 17:10:15 GMT<br>Date: Tue, 08 Jul. 2003 17:10:15 GMT<br>Content-Length: 402 | http://i.a.cnn.net/cnn/.element/img/1.0/searchbar/bar.search.gif

| | |
|---|---|
| Size | 1107 |
| Binary | true |
| Blocking | false |
| Redirected to | |
| Modified | Tue Jul. 08, 2003 13:08:59 GMT-0400 (Eastern Daylight Time) |
| Expires | Tue Jul. 08, 2003 13:20:05 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 1107<br>Accept-Ranges: bytes<br>Surrogate-Server: AkamaiGHost, AkamaiGHost<br>Cache-Control: max-age = 667<br>Date: Tue, 08 Jul. 2003 17:10:17 GMT | http://i.a.cnn.net/cnn/.element/img/1.0/searchbar/
bar.top.bevel.gif

| Size | 181 |
|---|---|
| Binary | true |
| Blocking | false |
| Redirected to | |
| Modified | Tue Jul. 08, 2003 13:09:00 GMT-0400 (Eastern Daylight Time) |
| Expires | Tue Jul. 08, 2003 13:34:50 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 181<br>Accept-Ranges: bytes<br>Cache-Control: max-age = 1552<br>Date: Tue, 08 Jul. 2003 17:10:18 GMT<br>Surrogate-Server: AkamaiGHost | http://i.a.cnn.net/cnn/.element/img/1.0/searchbar/
bar.right.bevel.gif

| Size | 299 |
|---|---|
| Binary | true |
| Blocking | false |
| Redirected to | |
| Modified | Tue Jul. 08, 2003 13:09:00 GMT-0400 (Eastern Daylight Time) |
| Expires | Tue Jul. 08, 2003 13:33:30 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 299<br>Accept-Ranges: bytes<br>Cache-Control: max-age = 1472<br>Date: Tue, 08 Jul. 2003 17:10:18 GMT<br>Surrogate-Server: AkamaiGHost | http://i.a.cnn.net/cnn/.element/img/1.0/searchbar/
bar.google.gif

| Size | 1273 |
|---|---|
| Binary | true |
| Blocking | false |
| Redirected to | |
| Modified | Tue Jul. 08, 2003 13:09:01 GMT-0400 (Eastern Daylight Time) |
| Expires | Tue Jul. 08, 2003 13:32:54 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 1273<br>Accept-Ranges: bytes<br>Cache-Control: max-age = 1436<br>Date: Tue, 08 Jul. 2003 17:10:18 GMT<br>Surrogate-Server: AkamaiGHost | http://i.a.cnn.net/cnn/.element/img/1.0/searchbar/
bar.bottom.bevel.gif

| Size | 211 |
|---|---|
| Binary | true |
| Blocking | false |
| Redirected to | |
| Modified | Tue Jul. 08, 2003 13:09:01 GMT-0400 (Eastern Daylight Time) |
| Expires | Tue Jul. 08, 2003 13:15:13 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 211<br>Accept-Ranges: bytes<br>Cache-Control: max-age = 375<br>Date: Tue, 08 Jul. 2003 17:10:19 GMT<br>Surrogate-Server: AkamaiGHost | http://i.a.cnn.net/cnn/.element/img/1.0/main/nav_at_
money.gif

| Size | 90 |
|---|---|
| Binary | true |
| Blocking | false |
| Redirected to | |
| Modified | Tue Jul. 08, 2003 13:09:03 GMT-0400 (Eastern Daylight Time) |
| Expires | Tue Jul. 08, 2003 13:31:57 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 90<br>Accept-Ranges: bytes<br>Cache-Control: max-age = 1379<br>Date: Tue, 08 Jul. 2003 17:10:20 GMT<br>Surrogate-Server: AkamaiGHost | http://i.a.cnn.net/cnn/.element/img/1.0/main/na-
v_at_si.gif

| Size | 82 |
|---|---|
| Binary | true |
| Blocking | false |
| Redirected to | |
| Modified | Tue Jul. 08, 2003 13:09:05 GMT-0400 (Eastern Daylight Time) |
| Expires | Tue Jul. 08, 2003 13:49:07 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 82<br>Accept-Ranges: bytes<br>Cache-Control: max-age = 2409<br>Date: Tue, 08 Jul. 2003 17:10:20 GMT<br>Surrogate-Server: AkamaiGHost | http://ar.atwola.com/html/93166917/48441749/
aol?SNM=HIDBFV&width=120&height=90&
target=_top&TZ=240&TVAR=class%3Dus.low&CT=I

| | |
|---|---|
| Size | 410 |
| Binary | false |
| Blocking | false |
| Redirected to | |
| Modified | Tue Jul. 08, 2003 13:09:00 GMT-0400 (Eastern Daylight Time) |
| Expires | Wed Dec. 31, 1969 19:00:00 GMT-0500 (Eastern Standard Time) |
| HTTP Header | HTTP/1.1 200 OK |
| | Content-Type: text/html |
| | Pragma: no-cache |
| | Cache-Control: no-cache |
| | Expires: Tue, 08 Jul. 2003 17:10:18 GMT |
| | Date: Tue, 08 Jul. 2003 17:10:18 GMT |
| | Content-Length: 410 | http://i.a.cnn.net/cnn/.element/img/1.0/sect/SEARCH/nav.search.gif

| | |
|---|---|
| Size | 1105 |
| Binary | true |
| Blocking | false |
| Redirected to | |
| Modified | Tue Jul. 08, 2003 13:09:06 GMT-0400 (Eastern Daylight Time) |
| Expires | Tue Jul. 08, 2003 13:15:27 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:28 GMT |
| | Content-Length: 1105 |
| | Accept-Ranges: bytes |
| | Cache-Control: max-age = 389 |
| | Date: Tue, 08 Jul. 2003 17:10:22 GMT |
| | Surrogate-Server: AkamaiGHost | http://i.cnn.net/cnn/2003/images/07/08/top.miss.meridian.gif

| | |
|---|---|
| Size | 9497 |
| Binary | true |
| Blocking | false |
| Redirected to | |
| Modified | Tue Jul. 08, 2003 13:09:06 GMT-0400 (Eastern Daylight Time) |
| Expires | Tue Jul. 08, 2003 13:09:00 GMT-0400 (Eastern Daylight Time) |
| HTTP Header | HTTP/1.0 200 OK |
| | Server: Netscape-Enterprise/6.1 AOL |
| | Date: Tue, 08 Jul. 2003 16:12:13 GMT |
| | Content-Type: image/gif |
| | Last-Modified: Tue, 08 Jul. 2003 16:09:13 GMT |
| | Content-Length: 9497 |
| | Accept-Ranges: bytes |
| | Age: 2162 |
| | X-Cache: HIT from i.cnn.net | http://i.a.cnn.net/cnn/.element/img/1.0/main/px_c00.gif

| | |
|---|---|
| Size | 43 |
| Binary | true |
| Blocking | false |
| Redirected to | |
| Modified | Tue Jul. 08, 2003 13:09:08 GMT-0400 (Eastern Daylight Time) |
| Expires | Tue Jul. 08, 2003 13:39:02 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:25 GMT |
| | Content-Length: 43 |
| | Accept-Ranges: bytes |
| | Cache-Control: max-age = 1804 |
| | Date: Tue, 08 Jul. 2003 17:10:24 GMT |
| | Surrogate-Server: AkamaiGHost | http://i.a.cnn.net/cnn/.element/img/1.0/main/user-picks.gif

| | |
|---|---|
| Size | 151 |
| Binary | true |
| Blocking | false |
| Redirected to | |
| Modified | Tue Jul. 08, 2003 13:09:10 GMT-0400 (Eastern Daylight Time) |
| Expires | Tue Jul. 08, 2003 13:24:45 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:25 GMT |
| | Content-Length: 151 |
| | Accept-Ranges: bytes |
| | Cache-Control: max-age = 947 |
| | Date: Tue, 08 Jul. 2003 17:10:25 GMT |
| | Surrogate-Server: AkamaiGHost | http://i.cnn.net/cnn/.element/img/1.0/misc/premium.gif

| | |
|---|---|
| Size | 74 |
| Binary | true |
| Blocking | false |
| Redirected to | |
| Modified | Tue Jul. 08, 2003 13:08:59 GMT-0400 (Eastern Daylight Time) |
| Expires | Tue Jul. 08, 2003 13:08:59 GMT-0400 (Eastern Daylight Time) |
| HTTP Header | HTTP/1.0 200 OK |
| | Server: Netscape-Enterprise/6.1 AOL |
| | Date: Thu, 26 Jun. 2003 03:06:00 GMT |
| | Content-Type: image/gif |
| | Last-Modified: Mon, 09 Jun. 2003 19:48:26 GMT |
| | Content-Length: 74 |
| | Accept-Ranges: bytes |
| | Age: 12938 |
| | X-Cache: HIT from i.cnn.net | http://i.a.cnn.net/cnn/.element/img/1.0/main/px_c-cc.gif

| | |
|---|---|
| Size | 43 |
| Binary | true |
| Blocking | false |
| Redirected to | |
| Modified | Tue Jul. 08, 2003 13:09:10 GMT-0400 (Eastern Daylight Time) |
| Expires | Tue Jul. 08, 2003 13:28:53 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 43<br>Accept-Ranges: bytes<br>Cache-Control: max-age = 1195<br>Date: Tue, 08 Jul. 2003 17:10:26 GMT<br>Surrogate-Server: AkamaiGHost | http://i.a.cnn.net/cnn/.element/img/1.0/misc/audio.gif

| | |
|---|---|
| Size | 61 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:23:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:27 GMT<br>Content-Length: 61<br>Accept-Ranges: bytes<br>Cache-Control: max-age = 880<br>Date: Tue, 08 Jul. 2003 17:10:28 GMT<br>Surrogate-Server: AkamaiGHost | http://i.a.cnn.net/cnn/images/1.gif

| | |
|---|---|
| Size | 43 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:39:49 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Tue, 27 May 2003 19:00:10 GMT<br>Content-Length: 43<br>Accept-Ranges: bytes<br>Cache-Control: max-age = 1851<br>Date: Tue, 08 Jul. 2003 17:10:29 GMT<br>Surrogate-Server: AkamaiGHost | http://i.a.cnn.net/cnn/.element/img/1.0/main/more.video.blue.gif

| | |
|---|---|
| Size | 153 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:25:02 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 153<br>Accept-Ranges: bytes<br>Cache-Control: max-age = 964<br>Date: Tue, 08 Jul. 2003 17:10:30 GMT<br>Surrogate-Server: AkamaiGHost | http://i.a.cnn.net/cnn/images/icons/premium.gif

| | |
|---|---|
| Size | 74 |
| Binary | true |
| Blocking | false |
| Redirected to | |
| Modified | Tue Jul. 08, 2003 13:09:12 GMT-0400 (Eastern Daylight Time) |
| Expires | Tue Jul. 08, 2003 13:34:35 GMT-0400 (Eastern Daylight Time) |
| HTTP Header | HTTP/1.0 200 OK<br>Last-Modified: Wed, 13 Mar. 2002 21:19:25 GMT<br>Accept-Ranges: bytes<br>Server: Netscape-Enterprise/6.1 AOL<br>Content-Type: image/gif<br>Content-Length: 74<br>Surrogate-Server: AkamaiGHost, AkamaiGHost, AkamaiGHost<br>Cache-Control: max-age = 1537<br>Expires: Tue, 08 Jul. 2003 17:36:07 GMT<br>Date: Tue, 08 Jul. 2003 17:10:30 GMT | http://i.a.cnn.net/cnn/video/iraq/2003/07/08/ja.baghd.at.night.vs.cnn.jpg

| | |
|---|---|
| Size | 5388 |
| Binary | true |
| Blocking | false |
| Redirected to | |
| Modified | Tue Jul. 08, 2003 13:09:13 GMT-0400 (Eastern Daylight Time) |
| Expires | Tue Jul. 08, 2003 13:24:19 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 05:48:35 GMT<br>Content-Length: 5388<br>Accept-Ranges: bytes<br>Cache-Control: max-age = 921<br>Date: Tue, 08 Jul. 2003 17:10:30 GMT<br>Surrogate-Server: AkamaiGHost | http://i.a.cnn.net/cnn/.element/img/1.0/main/super-links/health.gif

| | |
|---|---|
| Size | 161 |
| Binary | true |
| Blocking | false |
| Redirected to | |
| Modified | Tue Jul. 08, 2003 13:09:13 GMT-0400 (Eastern Daylight Time) |
| Expires | Tue Jul. 08, 2003 13:32:16 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 161<br>Accept-Ranges: bytes<br>Surrogate-Server: AkamaiGHost, AkamaiGHost<br>Cache-Control: max-age = 1398<br>Date: Tue, 08 Jul. 2003 17:10:30 GMT | http://i.a.cnn.net/cnn/2003/HEALTH/07/08/otsc.gupta/tz.gupta.jpg

| | |
|---|---|
| Size | 3702 |
| Binary | true |
| Blocking | false |
| Redirected to | |
| Modified | Tue Jul. 08, 2003 13:09:14 GMT-0400 (Eastern Daylight Time) |
| Expires | Tue Jul. 08, 2003 13:34:28 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 13:26:21 GMT<br>Content-Length: 3702<br>Accept-Ranges: bytes<br>Surrogate-Server: AkamaiGHost, AkamaiGHost<br>Cache-Control: max-age = 1530<br>Date: Tue, 08 Jul. 2003 17:10:32 GMT | http://i.a.cnn.net/cnn/.element/img/1.0/main/at_cnnmoney.gif

| | |
|---|---|
| Size | 559 |
| Binary | true |
| Blocking | false |
| Redirected to | |
| Modified | Tue Jul. 08, 2003 13:09:14 GMT-0400 (Eastern Daylight Time) |
| Expires | Tue Jul. 08, 2003 13:23:25 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 559<br>Accept-Ranges: bytes<br>Cache-Control: max-age = 867 |

-continued

| | |
|---|---|
| | Date: Tue, 08 Jul. 2003 17:10:32 GMT<br>Surrogate-Server: AkamaiGHost | http://i.a.cnn.net/cnn/.element/img/1.0/main/business.news.blue.gif

| | |
|---|---|
| Size | 169 |
| Binary | true |
| Blocking | false |
| Redirected to | |
| Modified | Tue Jul. 08, 2003 13:09:15 GMT-0400 (Eastern Daylight Time) |
| Expires | Tue Jul. 08, 2003 14:00:21 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 169<br>Accept-Ranges: bytes<br>Cache-Control: max-age = 3083<br>Date: Tue, 08 Jul. 2003 17:10:33 GMT<br>Surrogate-Server: AkamaiGHost | http://ar.atwola.com/image/93103306/aol

| | |
|---|---|
| Size | 0 |
| Binary | true |
| Blocking | false |
| Redirected to | http://ar.atwola.com/content/B0/0/H7pTL2Luf0_kw3xmlj8W1sns8a9RRNke8_SAqLz-KBa609jmULHVa8jgFKtiL69KXTPCmjMkYOv-M5C_xF3lKNjRbUvMSjKyxE7A6B3LIHANk$/aol |
| Modified | Tue Jul. 08, 2003 13:09:00 GMT-0400 (Eastern Daylight Time) |
| Expires | Wed Dec. 31, 1969 19:00:00 GMT-0500 (Eastern Standard Time) |
| HTTP Header | HTTP/1.1 302 Found<br>Pragma: no-cache<br>Cache-Control: no-cache<br>Expires: Tue, 08 Jul. 2003 17:10:16 GMT<br>Location: http://ar.atwola.com/content/B0/0/H7pTL2Luf0_kw3xmlj8W1sns8a9RRNke8_SAqLz-KBa609jmULHVa8jgFKtiL69KXTPCmjMkYOv-M5C_xF3lKNjRbUvMSjKyxE7A6B3LIHANk$/aol<br>P3P: CP = "CUR TAI PSA UNI COM NAV STA NOI OUR"<br>Date: Tue, 08 Jul. 2003 17:10:16 GMT<br>Content-Length: 0 | http://ar.atwola.com/content/B0/0/H7pTL2Luf0_kw3xmlj8W1sns8a9RRNke8_SAqLzKBa609jmULHVa8jgFKtiL69KXTPCmjMk-YOvM5C_xF3lKNjRbUvMSjKyxE7A6B3LIHAN k$/aol

| | |
|---|---|
| Size | 696 |
| Binary | false |
| Blocking | false |

-continued

| | |
|---|---|
| Redirected to | |
| Modified | Tue Jul. 08, 2003 13:09:05 GMT-0400 (Eastern Daylight Time) |
| Expires | Fri Jul. 11, 2003 13:09:00 GMT-0400 (Eastern Daylight Time) |
| HTTP Header | HTTP/1.1 200 OK |
| | Last-Modified: Sat, 05 Jul. 2003 17:10:20 GMT |
| | Expires: Fri, 11 Jul. 2003 17:10:20 GMT |
| | Date: Tue, 08 Jul. 2003 17:10:20 GMT |
| | Content-Length: 696 |
| | Content-Type: image/gif | http://i.cnn.net/cnn/.element/img/1.0/main/arrow_down.gif

| | |
|---|---|
| Size | 70 |
| Binary | true |
| Blocking | false |
| Redirected to | |
| Modified | Tue Jul. 08, 2003 13:09:02 GMT-0400 (Eastern Daylight Time) |
| Expires | Tue Jul. 08, 2003 13:09:02 GMT-0400 (Eastern Daylight Time) |
| HTTP Header | HTTP/1.0 200 OK |
| | Server: Netscape-Enterprise/6.1 AOL |
| | Date: Thu, 26 Jun. 2003 03:01:27 GMT |
| | Content-Type: image/gif |
| | Last-Modified: Mon, 09 Jun. 2003 19:48:24 GMT |
| | Content-Length: 70 |
| | Accept-Ranges: bytes |
| | Age: 1724 |
| | X-Cache: HIT from i.cnn.net | http://i.cnn.net/cnn/.element/img/1.0/main/arrow_up.gif

| | |
|---|---|
| Size | 70 |
| Binary | true |
| Blocking | false |
| Redirected to | |
| Modified | Tue Jul. 08, 2003 13:09:06 GMT-0400 (Eastern Daylight Time) |
| Expires | Tue Jul. 08, 2003 13:09:06 GMT-0400 (Eastern Daylight Time) |
| HTTP Header | HTTP/1.0 200 OK |
| | Server: Netscape-Enterprise/6.1 AOL |
| | Date: Sat, 21 Jun. 2003 05:12:01 GMT |
| | Content-Type: image/gif |
| | Last-Modified: Mon, 09 Jun. 2003 19:48:24 GMT |
| | Content-Length: 70 |
| | Accept-Ranges: bytes |
| | Age: 8558 |
| | X-Cache: HIT from i.cnn.net | http://i.a.cnn.net/cnn/.element/img/1.0/main/ftn.breaking.alerts.gif

| | |
|---|---|
| Size | 1919 |
| Binary | true |
| Blocking | false |
| Redirected to | |
| Modified | Tue Jul. 08, 2003 13:09:15 GMT-0400 (Eastern Daylight Time) |
| Expires | Tue Jul. 08, 2003 13:36:45 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:26 GMT |
| | Content-Length: 1919 |
| | Accept-Ranges: bytes |
| | Cache-Control: max-age = 1667 |
| | Date: Tue, 08 Jul. 2003 17:10:33 GMT |
| | Surrogate-Server: AkamaiGHost | http://i.a.cnn.net/cnn/.element/img/1.0/main/ftn.345x32.try.timeMay03.gif

| | |
|---|---|
| Size | 2035 |
| Binary | true |
| Blocking | false |
| Redirected to | |
| Modified | Tue Jul. 08, 2003 13:09:16 GMT-0400 (Eastern Daylight Time) |
| Expires | Tue Jul. 08, 2003 13:18:33 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 07 Jul. 2003 20:55:34 GMT |
| | Content-Length: 2035 |
| | Accept-Ranges: bytes |
| | Cache-Control: max-age = 575 |
| | Date: Tue, 08 Jul. 2003 17:10:33 GMT |
| | Surrogate-Server: AkamaiGHost | http://i.a.cnn.net/cnn/.element/img/1.0/main/super-links/reports.gif

| | |
|---|---|
| Size | 170 |
| Binary | true |
| Blocking | false |
| Redirected to | |
| Modified | Tue Jul. 08, 2003 13:09:16 GMT-0400 (Eastern Daylight Time) |
| Expires | Tue Jul. 08, 2003 13:57:16 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:25 GMT |
| | Content-Length: 170 |
| | Accept-Ranges: bytes |
| | Surrogate-Server: AkamaiGHost, AkamaiGHost |
| | Cache-Control: max-age = 2898 |
| | Date: Tue, 08 Jul. 2003 17:10:34 GMT | http://i.a.cnn.net/cnn/images/programming.boxes/tz.machu.picchu.jpg

| | |
|---|---|
| Size | 1050 |
| Binary | true |
| Blocking | false |
| Redirected to | |
| Modified | Tue Jul. 08, 2003 13:09:16 GMT-0400 (Eastern Daylight Time) |
| Expires | Tue Jul. 08, 2003 13:19:50 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Mon, 07 Jul. 2003 20:35:45 GMT<br>Content-Length: 1050<br>Accept-Ranges: bytes<br>Cache-Control: max-age = 652<br>Date: Tue, 08 Jul. 2003 17:10:35 GMT<br>Surrogate-Server: AkamaiGHost | http://i.a.cnn.net/cnn/.element/img/1.0/main/super-links/technology.gif

| | |
|---|---|
| Size | 186 |
| Binary | true |
| Blocking | false |
| Redirected to | |
| Modified | Tue Jul. 08, 2003 13:09:17 GMT-0400 (Eastern Daylight Time) |
| Expires | Tue Jul. 08, 2003 13:22:12 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 186<br>Accept-Ranges: bytes<br>Cache-Control: max-age = 794<br>Date: Tue, 08 Jul. 2003 17:10:35 GMT<br>Surrogate-Server: AkamaiGHost | http://i.a.cnn.net/cnn/2003/TECH/ptech/07/08/pop-sci.ul.labs/tz.ul.lab.cnn.jpg

| | |
|---|---|
| Size | 1258 |
| Binary | true |
| Blocking | false |
| Redirected to | |
| Modified | Tue Jul. 08, 2003 13:09:17 GMT-0400 (Eastern Daylight Time) |
| Expires | Tue Jul. 08, 2003 13:25:42 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 13:47:23 GMT<br>Content-Length: 1258<br>Accept-Ranges: bytes<br>Cache-Control: max-age = 1004<br>Date: Tue, 08 Jul. 2003 17:10:35 GMT<br>Surrogate-Server: AkamaiGHost | http://i.a.cnn.net/cnn/.element/img/1.0/main/us.gif

| | |
|---|---|
| Size | 352 |
| Binary | true |
| Blocking | false |
| Redirected to | |
| Modified | Tue Jul. 08, 2003 13:09:17 GMT-0400 (Eastern Daylight Time) |
| Expires | Tue Jul. 08, 2003 13:25:22 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 352<br>Accept-Ranges: bytes<br>Cache-Control: max-age = 984<br>Date: Tue, 08 Jul. 2003 17:10:35 GMT<br>Surrogate-Server: AkamaiGHost | http://i.a.cnn.net/cnn/.element/img/1.0/main/world.gif

| | |
|---|---|
| Size | 456 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:57:41 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 456<br>Accept-Ranges: bytes<br>Cache-Control: max-age = 2923<br>Date: Tue, 08 Jul. 2003 17:10:36 GMT<br>Surrogate-Server: AkamaiGHost | http://i.cnn.net/cnn/.element/img/1.0/misc/icon.external.links.gif

| | |
|---|---|
| Size | 104 |
| Binary | true |
| Blocking | false |
| Redirected to | |
| Modified | Tue Jul. 08, 2003 13:09:09 GMT-0400 (Eastern Daylight Time) |
| Expires | Tue Jul. 08, 2003 13:09:09 GMT-0400 (Eastern Daylight Time) |
| HTTP Header | HTTP/1.0 200 OK<br>Server: Netscape-Enterprise/6.1 AOL<br>Date: Fri, 20 Jun. 2003 15:39:46 GMT<br>Content-Type: image/gif<br>Last-Modified: Mon, 09 Jun. 2003 19:48:26 GMT<br>Content-Length: 104<br>Accept-Ranges: bytes<br>Age: 11403<br>X-Cache: HIT from i.cnn.net | http://i.a.cnn.net/cnn/.element/img/1.0/main/technology.gif

| | |
|---|---|
| Size | 731 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:32:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 731<br>Accept-Ranges: bytes<br>Cache-Control: max-age = 1420<br>Date: Tue, 08 Jul. 2003 17:10:36 GMT<br>Surrogate-Server: AkamaiGHost | http://i.a.cnn.net/cnn/.element/img/1.0/main/entertainment.gif

| | |
|---|---|
| Size | 661 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:42:43 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 661<br>Accept-Ranges: bytes<br>Cache-Control: max-age = 2025<br>Date: Tue, 08 Jul. 2003 17:10:36 GMT<br>Surrogate-Server: AkamaiGHost | http://i.a.cnn.net/cnn/.element/img/1.0/main/politics.gif

| | |
|---|---|
| Size | 484 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:47:26 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 484<br>Accept-Ranges: bytes<br>Cache-Control: max-age = 2308<br>Date: Tue, 08 Jul. 2003 17:10:36 GMT<br>Surrogate-Server: AkamaiGHost | http://i.a.cnn.net/cnn/.element/img/1.0/main/law.gif

| | |
|---|---|
| Size | 394 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:59:39 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 394<br>Accept-Ranges: bytes<br>Cache-Control: max-age = 3041<br>Date: Tue, 08 Jul. 2003 17:10:37 GMT<br>Surrogate-Server: AkamaiGHost | http://i.a.cnn.net/cnn/.element/img/1.0/main/health.gif

| | |
|---|---|
| Size | 448 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:40:46 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 448<br>Accept-Ranges: bytes<br>Cache-Control: max-age = 1908<br>Date: Tue, 08 Jul. 2003 17:10:37 GMT<br>Surrogate-Server: AkamaiGHost | http://i.a.cnn.net/cnn/.element/img/1.0/main/space.gif

| | |
|---|---|
| Size | 914 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:28:53 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 914<br>Accept-Ranges: bytes<br>Surrogate-Server: AkamaiGHost, AkamaiGHost<br>Cache-Control: max-age = 1195<br>Date: Tue, 08 Jul. 2003 17:10:37 GMT | http://i.a.cnn.net/cnn/.element/img/1.0/main/travel.gif

| | |
|---|---|
| Size | 442 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:37:01 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 442<br>Accept-Ranges: bytes<br>Surrogate-Server: AkamaiGHost, AkamaiGHost<br>Cache-Control: max-age = 1683<br>Date: Tue, 08 Jul. 2003 17:10:37 GMT | http://i.a.cnn.net/cnn/.element/img/1.0/main/education.gif

| | |
|---|---|
| Size | 536 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:16:18 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 536<br>Accept-Ranges: bytes<br>Cache-Control: max-age = 440<br>Date: Tue, 08 Jul. 2003 17:10:38 GMT<br>Surrogate-Server: AkamaiGHost | http://i.a.cnn.net/cnn/.element/img/1.0/main/sports.gif

| | |
|---|---|
| Size | 452 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 14:02:04 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 452<br>Accept-Ranges: bytes<br>Cache-Control: max-age = 3186 |

-continued

| | |
|---|---|
| | Date: Tue, 08 Jul. 2003 17:10:38 GMT<br>Surrogate-Server: AkamaiGHost | http://i.a.cnn.net/cnn/.element/img/1.0/main/business.gif

| | |
|---|---|
| Size | 515 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:19:24 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 515<br>Accept-Ranges: bytes<br>Surrogate-Server: AkamaiGHost, AkamaiGHost<br>Cache-Control: max-age = 626<br>Date: Tue, 08 Jul. 2003 17:10:38 GMT | http://i.a.cnn.net/cnn/.element/img/1.0/misc/diagonal.gif

| | |
|---|---|
| Size | 86 |
| Binary | true |
| Blocking | false |
| Redirected to | |
| Modified | Tue Jul. 08, 2003 13:09:20 GMT-0400 (Eastern Daylight Time) |
| Expires | Tue Jul 08. 2003, 13:43:03 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:27 GMT<br>Content-Length: 86<br>Accept-Ranges: bytes<br>Cache-Control: max-age = 2045<br>Date: Tue, 08 Jul. 2003 17:10:38 GMT<br>Surrogate-Server: AkamaiGHost | http://i.a.cnn.net/cnn/.element/img/1.0/main/tv.schedule.gif

| | |
|---|---|
| Size | 161 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:19:12 GMT-0400 (Eastern Daylight Time) |
| HTTP Header | HTTP/1.0 200 OK<br>Server: Netscape-Enterprise/6.1 AOL<br>Content-Type: image/gif |

-continued

```
                Last-Modified: Mon, 09 Jun. 2003
                19:48:25 GMT
                Content-Length: 161
                Accept-Ranges: bytes
                Cache-Control: max-age = 614
                Date: Tue, 08 Jul. 2003 17:10:39 GMT
                Surrogate-Server: AkamaiGHost
``` http://i.cnn.net/cnn/CNN/Programs/includes/show-box/images/paula.zahn.gif

```
Size            3762
Binary          true
Blocking        false
Redirected to
Modified        Tue Jul. 08, 2003 13:09:11 GMT-0400 (Eastern
                Daylight Time)
Expires         Tue Jul. 08, 2003 13:09:09 GMT-0400 (Eastern
                Daylight Time)
HTTP Header     HTTP/1.0 200 OK
                Server: Netscape-Enterprise/6.1 AOL
                Date: Thu, 22 May 2003 22:29:24 GMT
                Content-Type: image/gif
                Last-Modified: Sun, 18 Aug. 2002
                18:22:27 GMT
                Content-Length: 3762
                Accept-Ranges: bytes
                Age: 67768
                X-Cache: HIT from i.cnn.net
``` http://i.a.cnn.net/cnn/.element/img/1.0/main/super-links/us.gif

```
Size            145
Binary          true
Blocking        false
Redirected to
Modified        Tue Jul. 08, 2003 13:09:20 GMT-0400 (Eastern
                Daylight Time)
Expires         Tue Jul. 08, 2003 13:23:54 GMT-0400 (Eastern
                Daylight Time)
HTTP Header     HTTP/1.0 200 OK
                Server: Netscape-Enterprise/6.1 AOL
                Content-Type: image/gif
                Last-Modified: Mon, 09 Jun. 2003
                19:48:26 GMT
                Content-Length: 145
                Accept-Ranges: bytes
                Cache-Control: max-age = 896
                Date: Tue, 08 Jul. 2003 17:10:39 GMT
                Surrogate-Server: AkamaiGHost
``` http://i.a.cnn.net/cnn/2003/US/07/08/nyt.kristof/tz.blair.jpg

```
Size            4091
Binary          true
Blocking        false
Redirected to
Modified        Tue Jul. 08, 2003 13:09:22 GMT-0400 (Eastern
                Daylight Time)
Expires         Tue Jul. 08, 2003 13:56:56 GMT-0400 (Eastern
                Daylight Time)
HTTP Header     HTTP/1.0 200 OK
                Server: Netscape-Enterprise/6.1 AOL
                Content-Type: image/jpeg
                Last-Modified: Tue, 08 Jul. 2003
                15:48:13 GMT
                Content-Length: 4091
                Accept-Ranges: bytes
                Cache-Control: max-age = 2878
                Date: Tue, 08 Jul. 2003 17:10:39 GMT
                Surrogate-Server: AkamaiGHost
``` http://i.a.cnn.net/cnn/.element/img/1.0/main/super-links/offbeat.gif

```
Size            171
Binary          true
Blocking        false
Redirected to
Modified        Tue Jul. 08, 2003 13:09:22 GMT-0400 (Eastern
                Daylight Time)
Expires         Tue Jul. 08, 2003 13:42:20 GMT-0400 (Eastern
                Daylight Time)
HTTP Header     HTTP/1.0 200 OK
                Server: Netscape-Enterprise/6.1 AOL
                Content-Type: image/gif
                Last-Modified: Mon, 09 Jun. 2003
                19:48:26 GMT
                Content-Length: 171
                Accept-Ranges: bytes
                Cache-Control: max-age = 2002
                Date: Tue, 08 Jul. 2003 17:10:39 GMT
                Surrogate-Server: AkamaiGHost
``` http://i.a.cnn.net/cnn/2003/US/Southwest/07/08/offbeat.editor.fired/tz.caddyshack.jpg

```
Size            2064
Binary          true
Blocking        false
Redirected to
Modified        Tue Jul. 08, 2003 13:09:23 GMT-0400 (Eastern
                Daylight Time)
Expires         Tue Jul. 08, 2003 13:53:26 GMT-0400 (Eastern
                Daylight Time)
HTTP Header     HTTP/1.0 200 OK
                Server: Netscape-Enterprise/6.1 AOL
                Content-Type: image/jpeg
                Last-Modified: Tue, 08 Jul. 2003 16:37:42
                GMT
                Content-Length: 2064
                Accept-Ranges: bytes
                Surrogate-Server: AkamaiGHost,
                AkamaiGHost
                Cache-Control: max-age = 2667
                Date: Tue, 08 Jul. 2003 17:10:40 GMT
``` http://i.a.cnn.net/cnn/.element/img/1.0/main/quick-vote.no.sponsor.gif

| | |
|---|---|
| Size | 1437 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:50:00 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 1437<br>Accept-Ranges: bytes<br>Surrogate-Server: AkamaiGHost, AkamaiGHost<br>Cache-Control: max-age = 2461<br>Date: Tue, 08 Jul. 2003 17:10:41 GMT | http://i.a.cnn.net/cnn/.element/img/1.0/main/icon_external.gif

| | |
|---|---|
| Size | 104 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:32:52 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 104<br>Accept-Ranges: bytes<br>Cache-Control: max-age = 1433<br>Date: Tue, 08 Jul. 2003 17:10:41 GMT<br>Surrogate-Server: AkamaiGHost | http://i.a.cnn.net/cnn/.element/img/1.0/main/partner_time.gif

| | |
|---|---|
| Size | 439 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:48:52 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 439<br>Accept-Ranges: bytes<br>Cache-Control: max-age = 2393 |

-continued

| | |
|---|---|
| | Date: Tue, 08 Jul. 2003 17:10:42 GMT<br>Surrogate-Server: AkamaiGHost | http://i.a.cnn.net/cnn/.element/img/1.0/main/partner_si.gif

| | |
|---|---|
| Size | 973 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:25:00 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 973<br>Accept-Ranges: bytes<br>Cache-Control: max-age = 961<br>Date: Tue, 08 Jul. 2003 17:10:42 GMT<br>Surrogate-Server: AkamaiGHost | http://i.a.cnn.net/cnn/.element/img/1.0/main/partner_fortune.gif

| | |
|---|---|
| Size | 938 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:25:29 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 938<br>Accept-Ranges: bytes<br>Surrogate-Server: AkamaiGHost, AkamaiGHost, AkamaiGHost<br>Cache-Control: max-age = 990<br>Date: Tue, 08 Jul. 2003 17:10:42 GMT | http://i.a.cnn.net/cnn/.element/img/1.0/sect/SEARCH/dotted.line.gif

| | |
|---|---|
| Size | 69 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:23:14 GMT-0400 (Eastern Daylight Time) |
| HTTP Header | HTTP/1.0 200 OK<br>Server: Netscape-Enterprise/6.1 AOL<br>Content-Type: image/gif |

-continued

|   |   |
|---|---|
| | Last-Modified: Mon, 09 Jun. 2003 19:48:28 GMT<br>Content-Length: 69<br>Accept-Ranges: bytes<br>Cache-Control: max-age = 855<br>Date: Tue, 08 Jul. 2003 17:10:42 GMT<br>Surrogate-Server: AkamaiGHost | http://i.a.cnn.net/cnn/.element/img/1.0/misc/icon.external.links.gif

| | |
|---|---|
| Size | 104 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:50:35 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 104<br>Accept-Ranges: bytes<br>Cache-Control: max-age = 2496<br>Date: Tue, 08 Jul. 2003 17:10:43 GMT<br>Surrogate-Server: AkamaiGHost | http://ar.atwola.com/html/93103308/48441749/aol?SNM=HIDBFV&width=88&height=31&target=_top&TZ=240&TVAR=class%3Dus.low&CT=I

| | |
|---|---|
| Size | 377 |
| Binary | false |
| Blocking | false |
| Redirected to | |
| Modified | Tue Jul. 08, 2003 13:09:01 GMT-0400 (Eastern Daylight Time) |
| Expires | Wed Dec. 31, 1969 19:00:00 GMT-0500 (Eastern Standard Time) |
| HTTP Header | HTTP/1.1 200 OK<br>Content-Type: text/html<br>Pragma: no-cache<br>Cache-Control: no-cache<br>Expires: Tue, 08 Jul. 2003 17:10:16 GMT<br>Date: Tue, 08 Jul. 2003 17:10:16 GMT<br>Content-Length: 377 | http://i.a.cnn.net/cnn/.element/img/1.0/main/icon_premium.gif

| | |
|---|---|
| Size | 74 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:37:32 GMT-0400 (Eastern Daylight Time) |

-continued

| | |
|---|---|
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 74<br>Accept-Ranges: bytes<br>Cache-Control: max-age = 1713<br>Date: Tue, 08 Jul. 2003 17:10:43 GMT<br>Surrogate-Server: AkamaiGHost | http://ar.atwola.com/html/93137910/48441749/aol?SNM=HIDBFV&width=101&height=1&target=_top&TZ=240&TVAR=class%3Dus.low&CT=J&hw=docw

| | |
|---|---|
| Size | 267 |
| Binary | false |
| Blocking | true |
| Redirected to | |
| Modified | Tue Jul. 08, 2003 13:09:02 GMT-0400 (Eastern Daylight Time) |
| Expires | Wed Dec. 31, 1969 19:00:00 GMT-0500 (Eastern Standard Time) |
| HTTP Header | HTTP/1.1 200 OK<br>Content-Type: application/x-javascript<br>Pragma: no-cache<br>Cache-Control: no-cache<br>Expires: Tue, 08 Jul. 2003 17:10:19 GMT<br>Date: Tue, 08 Jul. 2003 17:10:19 GMT<br>Content-Length: 267 | http://ar.atwola.com/file/adsEnd.js

| | |
|---|---|
| Size | 1551 |
| Binary | false |
| Blocking | true |
| Redirected to | |
| Modified | Tue Jul. 08, 2003 13:09:11 GMT-0400 (Eastern Daylight Time) |
| Expires | Wed Jul. 09, 2003 13:09:02 GMT-0400 (Eastern Daylight Time) |
| HTTP Header | HTTP/1.1 200 OK<br>Expires: Wed, 09 Jul. 2003 17:10:27 GMT<br>Date: Tue, 08 Jul. 2003 17:10:27 GMT<br>Content-Length: 1551<br>Content-Type: application/x-javascript | http://www.cnn.com/cookie.crumb

| | |
|---|---|
| Size | 43 |
| Binary | true |
| Blocking | false |
| Redirected to | |
| Modified | Tue Jul. 08, 2003 13:09:14 GMT-0400 (Eastern Daylight Time) |
| Expires | Wed Dec. 31, 1969 19:00:00 GMT-0500 (Eastern Standard Time) |
| HTTP Header | HTTP/1.1 200 OK<br>Server: Netscape-Enterprise/6.1 AOL |

-continued

Date: Tue, 08 Jul. 2003 17:10:31 GMT
Content-Length: 43
Content-Type: image/gif

Links

| URL | Total Score |
|---|---|

Satellite

Bandwidth 40960, Compression 1.0, DNS Lookup 1.5, Ping Latency 1.5

Web Page Scoring

Parameters

| | |
|---|---|
| Date Run | Tue Jul. 08, 2003 13:12:24 GMT-0400 (Eastern Daylight Time) |
| Bandwidth | 40960 |
| Compression | 1 |
| DNS Lookup Time | 1.5 |
| Ping Latency | 1.5 |
| Revisit Time | 86400 |
| IntraPage Time | 60 |
| User Perception Time | 10 |

Page: http://cnn.com/Score13.18

Page Scores

| | Blocking | Total |
|---|---|---|
| First Visit | 1.8 | 13.18 |
| Second Visit | 1.8 | 13.02 |

Notes
consider reducing redirections
consider reducing domain lookups
consider moving external scripts to inline or reducing domain lookups
consider moving external css to inline or reducing domain lookups
first visit: blocking latency dominates size
second visit: blocking latency dominates size

Summary Statistics

| | |
|---|---|
| Actual Load Time | 42.872 |
| Total Size | 173885 |
| Document Compressed | false |
| Redirects | 2 |
| Total Domains | 5 |
| Blocking Domains | 4 |
| Non Blocking Domains | 1 |

-continued

| | |
|---|---|
| Domains | cnn.com, www.cnn.com, i.cnn.net, ar.atwola.com, i.a.cnn.net |
| Extra Whitespace | 5149 |
| Inline Script Count | 6 |
| Inline Script Size | 1236 |
| External Script Count | 11 |
| External Script Size | 35033 |
| Inline Style Count | 1 |
| Inline Style Size | 110 |
| External Style Count | 3 |
| External Style Size | 25910 |
| DOM Depth | 26 |
| Table Depth | 5 | http://cnn.com/

| | |
|---|---|
| Size | 0 |
| Binary | false |
| Blocking | false |
| Redirected to | http://www.cnn.com/ |
| Modified | Tue Jul. 08, 2003 13:08:42 GMT-0400 (Eastern Daylight Time) |
| Expires | Wed Dec. 31, 1969 19:00:00 GMT-0500 (Eastern Standard Time) |
| HTTP Header | HTTP/1.1 302 Moved Temporarily<br>Server: Netscape-Enterprise/6.1 AOL<br>Date: Tue 08 Jul. 2003 17:10:02 GMT<br>Location: http://www.cnn.com/<br>Content-Length: 0<br>Content-Type: text/html | http://www.cnn.com/

| | |
|---|---|
| Size | 56730 |
| Binary | false |
| Blocking | false |
| Redirected to | |
| Modified | Tue Jul. 08, 2003 13:08:52 GMT-0400 (Eastern Daylight Time) |
| Expires | Tue Jul. 08, 2003 13:09:42 GMT-0400 (Eastern Daylight Time) |
| HTTP Header | HTTP/1.1 200 OK<br>Server: Netscape-Enterprise/6.1 AOL<br>Date: Tue, 08 Jul. 2003 17:10:02 GMT<br>Last-Modified: Tue, 08 Jul. 2003 17:10:00 GMT<br>Expires: Tue, 08 Jul. 2003 17:11:00 GMT<br>Cache-Control: private, max-age = 60<br>Content-Type: text/html | http://i.cnn.net/cnn/.element/ssi/css/1.0/main.css

| | |
|---|---|
| Size | 25910 |
| Binary | false |
| Blocking | true |
| Redirected to | |
| Modified | Tue Jul. 08, 2003 13:08:51 GMT-0400 (Eastern Daylight Time) |
| Expires | Tue Jul. 08, 2003 13:08:45 GMT-0400 (Eastern Daylight Time) |

-continued

| | |
|---|---|
| HTTP Header | HTTP/1.0 200 OK
Server: Netscape-Enterprise/6.1 AOL
Date: Wed, 25 Jun. 2003 15:05:51 GMT
Content-Type: text/css
Last-Modified: Wed, 25 Jun. 2003
15:04:29 GMT
Content-Length: 25910
Accept-Ranges: bytes
Age: 8543
X-Cache: HIT from i.cnn.net | http://i.cnn.net/cnn/.element/ssi/js/1.0/main.js

| | |
|---|---|
| Size | 21613 |
| Binary | false |
| Blocking | true |
| Redirected to | |
| Modified | Tue Jul. 08, 2003 13:08:54 GMT-0400 (Eastern Daylight Time) |
| Expires | Tue Jul. 08, 2003 13:08:52 GMT-0400 (Eastern Daylight Time) |
| HTTP Header | HTTP/1.0 200 OK
Server: Netscape-Enterprise/6.1 AOL
Date: Thu, 26 Jun. 2003 03:34:13 GMT
Content-Type: application/x-javascript
Last-Modified: Mon, 17 Mar. 2003
20:13:07 GMT
Content-Length: 21613
Accept-Ranges: bytes
Age: 787
X-Cache: HIT from i.cnn.net | http://ar.atwola.com/file/adsWrapper.js

| | |
|---|---|
| Size | 6039 |
| Binary | false |
| Blocking | true |
| Redirected to | |
| Modified | Tue Jul. 08, 2003 13:08:57 GMT-0400 (Eastern Daylight Time) |
| Expires | Wed Jul. 09, 2003 13:08:55 GMT-0400 (Eastern Daylight Time) |
| HTTP Header | HTTP/1.1 200 OK
Expires: Wed, 09 Jul. 2003 17:10:11 GMT
Date: Tue, 08 Jul. 2003 17:10:11 GMT
Content-Length: 6039
Content-Type: application/x-javascript | http://ar.atwola.com/file/adsPopup2.js

| | |
|---|---|
| Size | 5563 |
| Binary | false |
| Blocking | true |
| Redirected to | |
| Modified | Tue Jul. 08, 2003 13:08:58 GMT-0400 (Eastern Daylight Time) |
| Expires | Wed Jul. 09, 2003 13:08:57 GMT-0400 (Eastern Daylight Time) |
| HTTP Header | HTTP/1.1 200 OK
Expires: Wed, 09 Jul. 2003 17:10:14 GMT
Date: Tue, 08 Jul. 2003 17:10:14 GMT
Content-Length: 5563
Content-Type: application/x-javascript | http://i.cnn.net/cnn/images/1.gif

| | |
|---|---|
| Size | 43 |
| Binary | true |
| Blocking | false |
| Redirected to | |
| Modified | Tue Jul. 08, 2003 13:08:58 GMT-0400 (Eastern Daylight Time) |
| Expires | Tue Jul. 08, 2003 13:08:58 GMT-0400 (Eastern Daylight Time) |
| HTTP Header | HTTP/1.0 200 OK
Server: Netscape-Enterprise/6.1 AOL
Date: Fri, 20 Jun. 2003 15:36:44 GMT
Content-Type: image/gif
Last-Modified: Tue, 27 May 2003
19:00:10 GMT
Content-Length: 43
Accept-Ranges: bytes
Age: 2813
X-Cache: HIT from i.cnn.net | http://i.a.cnn.net/cnn/.element/img/1.0/logo/cnn.gif

| | |
|---|---|
| Size | 1910 |
| Binary | true |
| Blocking | false |
| Redirected to | |
| Modified | Tue Jul. 08, 2003 13:08:59 GMT-0400 (Eastern Daylight Time) |
| Expires | Tue Jul. 08, 2003 14:02:08 GMT-0400 (Eastern Daylight Time) |
| HTTP Header | HTTP/1.0 200 OK
Server: Netscape-Enterprise/6.1 AOL
Content-Type: image/gif
Last-Modified: Mon, 09 Jun. 2003
19:48:24 GMT
Content-Length: 1910
Accept-Ranges: bytes
Cache-Control: max-age = 3190
Date: Tue, 08 Jul. 2003 17:10:17 GMT
Surrogate-Server: AkamaiGHost | http://ar.atwola.com/html/93103287/48441749/
aol?SNM=HIDBFV&width=468&height=60&
target=_top&TZ=240&TVAR=class%3Dus.low&CT=I

| | |
|---|---|
| Size | 402 |
| Binary | false |
| Blocking | false |
| Redirected to | |
| Modified | Tue Jul. 08, 2003 13:08:59 GMT-0400 (Eastern Daylight Time) |
| Expires | Wed Dec. 31, 1969 19:00:00 GMT-0500 (Eastern Standard Time) |

-continued

| | |
|---|---|
| HTTP Header | HTTP/1.1 200 OK<br>Content-Type: text/html<br>Pragma: no-cache<br>Cache-Control: no-cache<br>Expires: Tue, 08 Jul. 2003, 17:10:15 GMT<br>Date: Tue, 08 Jul. 2003, 17:10:15 GMT<br>Content-Length: 402 | http://i.a.cnn.net/cnn/.element/img/1.0/searchbar/bar.search.gif

| | |
|---|---|
| Size | 1107 |
| Binary | true |
| Blocking | false |
| Redirected to | |
| Modified | Tue Jul. 08, 2003 13:08:59 GMT-0400 (Eastern Daylight Time) |
| Expires | Tue Jul. 08, 2003 13:20:05 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 1107<br>Accept-Ranges: bytes<br>Surrogate-Server: AkamaiGHost, AkamaiGHost<br>Cache-Control: max-age = 667<br>Date: Tue, 08 Jul. 2003 17:10:17 GMT | http://i.a.cnn.net/cnn/.element/img/1.0/searchbar/bar.top.bevel.gif

| | |
|---|---|
| Size | 181 |
| Binary | true |
| Blocking | false |
| Redirected to | |
| Modified | Tue Jul. 08, 2003 13:09:00 GMT-0400 (Eastern Daylight Time) |
| Expires | Tue Jul. 08, 2003 13:34:50 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 181<br>Accept-Ranges: bytes<br>Cache-Control: max-age = 1552<br>Date: Tue, 08 Jul. 2003 17:10:18 GMT<br>Surrogate-Server: AkamaiGHost | http://i.a.cnn.net/cnn/.element/img/1.0/searchbar/bar.right.bevel.gif

| | |
|---|---|
| Size | 299 |
| Binary | true |
| Blocking | false |
| Redirected to | |
| Modified | Tue Jul. 08, 2003 13:09:00 GMT-0400 (Eastern Daylight Time) |
| Expires | Tue Jul. 08, 2003 13:33:30 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 299<br>Accept-Ranges: bytes<br>Cache-Control: max-age = 1472<br>Date: Tue, 08 Jul. 2003 17:10:18 GMT<br>Surrogate-Server: AkamaiGHost | http://i.a.cnn.net/cnn/.element/img/1.0/searchbar/bar.google.gif

| | |
|---|---|
| Size | 1273 |
| Binary | true |
| Blocking | false |
| Redirected to | |
| Modified | Tue Jul. 08, 2003 13:09:01 GMT-0400 (Eastern Daylight Time) |
| Expires | Tue Jul. 08, 2003 13:32:54 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 1273<br>Accept-Ranges: bytes<br>Cache-Control: max-age = 1436<br>Date: Tue, 08 Jul. 2003 17:10:18 GMT<br>Surrogate-Server: AkamaiGHost | http://i.a.cnn.net/cnn/.element/img/1.0/searchbar/bar.bottom.bevel.gif

| | |
|---|---|
| Size | 211 |
| Binary | true |
| Blocking | false |
| Redirected to | |
| Modified | Tue Jul. 08, 2003 13:09:01 GMT-0400 (Eastern Daylight Time) |
| Expires | Tue Jul. 08, 2003 13:15:13 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 211<br>Accept-Ranges: bytes<br>Cache-Control: max-age = 375<br>Date: Tue, 08 Jul. 2003 17:10:19 GMT<br>Surrogate-Server: AkamaiGHost | http://i.a.cnn.net/cnn/.element/img/1.0/main/nav_at_money.gif

| | |
|---|---|
| Size | 90 |
| Binary | true |
| Blocking | false |
| Redirected to | |
| Modified | Tue Jul. 08, 2003 13:09:03 GMT-0400 (Eastern Daylight Time) |
| Expires | Tue Jul. 08, 2003 13:31:57 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 90<br>Accept-Ranges: bytes<br>Cache-Control: max-age = 1379<br>Date: Tue, 08 Jul. 2003 17:10:20 GMT<br>Surrogate-Server: AkamaiGHost | http://i.a.cnn.net/cnn/.element/img/1.0/main/nav_at_si.gif

| | |
|---|---|
| Size | 82 |
| Binary | true |
| Blocking | false |
| Redirected to | |
| Modified | Tue Jul. 08, 2003 13:09:05 GMT-0400 (Eastern Daylight Time) |
| Expires | Tue Jul. 08, 2003 13:49:07 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 82<br>Accept-Ranges: bytes<br>Cache-Control: max-age = 2409<br>Date: Tue, 08 Jul. 2003 17:10:20 GMT<br>Surrogate-Server: AkamaiGHost | http://ar.atwola.com/html/93166917/48441749/aol?SNM=HIDBFV&width=120&height=90&target=_top&TZ=240&TVAR=class%3Dus.low&CT=I

| | |
|---|---|
| Size | 410 |
| Binary | false |
| Blocking | false |
| Redirected to | |
| Modified | Tue Jul. 08, 2003 13:09:00 GMT-0400 (Eastern Daylight Time) |
| Expires | Wed Dec. 31, 1969 19:00:00 GMT-0500 (Eastern Standard Time) |
| HTTP Header | HTTP/1.1 200 OK<br>Content-Type: text/html<br>Pragma: no-cache<br>Cache-Control: no-cache<br>Expires: Tue, 08 Jul. 2003 17:10:18 GMT<br>Date: Tue, 08 Jul. 2003 17:10:18 GMT<br>Content-Length: 410 | http://i.a.cnn.net/cnn/.element/img/1.0/sect/SEARCH/nav.search.gif

| | |
|---|---|
| Size | 1105 |
| Binary | true |
| Blocking | false |
| Redirected to | |
| Modified | Tue Jul. 08, 2003 13:09:06 GMT-0400 (Eastern Daylight Time) |
| Expires | Tue Jul. 08, 2003 13:15:27 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:28 GMT<br>Content-Length: 1105<br>Accept-Ranges: bytes<br>Cache-Control: max-age = 389<br>Date: Tue, 08 Jul. 2003 17:10:22 GMT<br>Surrogate-Server: AkamaiGHost | http://i.cnn.net/cnn/2003/images/07/08/top.miss.meridian.gif

| | |
|---|---|
| Size | 9497 |
| Binary | true |
| Blocking | false |
| Redirected to | |
| Modified | Tue Jul. 08, 2003 13:09:06 GMT-0400 (Eastern Daylight Time) |
| Expires | Tue Jul. 08, 2003 13:09:00 GMT-0400 (Eastern Daylight Time) |
| HTTP Header | HTTP/1.0 200 OK<br>Server: Netscape-Enterprise/6.1 AOL<br>Date: Tue, 08 Jul. 2003 16:12:13 GMT<br>Content-Type: image/gif<br>Last-Modified: Tue, 08 Jul. 2003 16:09:13 GMT<br>Content-Length: 9497<br>Accept-Ranges: bytes<br>Age: 2162<br>X-Cache: HIT from i.cnn.net | http://i.a.cnn.net/cnn/.element/img/1.0/main/px_c00.gif

| | |
|---|---|
| Size | 43 |
| Binary | true |
| Blocking | false |
| Redirected to | |
| Modified | Tue Jul. 08, 2003 13:09:08 GMT-0400 (Eastern Daylight Time) |
| Expires | Tue Jul. 08, 2003 13:39:02 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 43<br>Accept-Ranges: bytes<br>Cache-Control: max-age = 1804<br>Date: Tue, 08 Jul. 2003 17:10:24 GMT<br>Surrogate-Server: AkamaiGHost | http://i.a.cnn.net/cnn/.element/img/1.0/main/user-picks.gif

| | |
|---|---|
| Size | 151 |
| Binary | true |
| Blocking | false |
| Redirected to | |
| Modified | Tue Jul. 08, 2003 13:09:10 GMT-0400 (Eastern Daylight Time) |
| Expires | Tue Jul. 08, 2003 13:24:45 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 151<br>Accept-Ranges: bytes<br>Cache-Control: max-age = 947<br>Date: Tue, 08 Jul. 2003 17:10:25 GMT<br>Surrogate-Server: AkamaiGHost | http://i.cnn.net/cnn/.element/img/1.0/misc/premium.gif

| | |
|---|---|
| Size | 74 |
| Binary | true |
| Blocking | false |
| Redirected to | |
| Modified | Tue Jul. 08, 2003 13:08:59 GMT-0400 (Eastern Daylight Time) |
| Expires | Tue Jul. 08, 2003 13:08:59 GMT-0400 (Eastern Daylight Time) |
| HTTP Header | HTTP/1.0 200 OK<br>Server: Netscape-Enterprise/6.1 AOL<br>Date: Thu, 26 Jun. 2003 03:06:00 GMT<br>Content-Type: image/gif<br>Last-Modified: Mon, 09 Jun. 2003 19:48:26 GMT<br>Content-Length: 74<br>Accept-Ranges: bytes<br>Age: 12938<br>X-Cache: HIT from i.cnn.net | http://i.a.cnn.net/cnn/.element/img/1.0/main/px_c-cc.gif

| | |
|---|---|
| Size | 43 |
| Binary | true |
| Blocking | false |
| Redirected to | |
| Modified | Tue Jul. 08, 2003 13:09:10 GMT-0400 (Eastern Daylight Time) |
| Expires | Tue Jul. 08, 2003 13:28:53 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 43<br>Accept-Ranges: bytes<br>Cache-Control: max-age = 1195<br>Date: Tue, 08 Jul. 2003 17:10:26 GMT<br>Surrogate-Server: AkamaiGHost | http://i.a.cnn.net/cnn/.element/img/1.0/misc/audio.gif

| | |
|---|---|
| Size | 61 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:23:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:27 GMT<br>Content-Length: 61<br>Accept-Ranges: bytes<br>Cache-Control: max-age = 880<br>Date: Tue, 08 Jul. 2003 17:10:28 GMT<br>Surrogate-Server: AkamaiGHost | http://i.a.cnn.net/cnn/images/1.gif

| | |
|---|---|
| Size | 43 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:39:49 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Tue, 27 May 2003 19:00:10 GMT<br>Content-Length: 43<br>Accept-Ranges: bytes<br>Cache-Control: max-age = 1851<br>Date: Tue, 08 Jul. 2003 17:10:29 GMT<br>Surrogate-Server: AkamaiGHost | http://i.a.cnn.net/cnn/.element/img/1.0/main/more.video.blue.gif

| | |
|---|---|
| Size | 153 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:25:02 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 153<br>Accept-Ranges: bytes<br>Cache-Control: max-age = 964<br>Date: Tue, 08 Jul. 2003 17:10:30 GMT<br>Surrogate-Server: AkamaiGHost | http://i.a.cnn.net/cnn/images/icons/premium.gif

| | |
|---|---|
| Size | 74 |
| Binary | true |
| Blocking | false |
| Redirected to | |
| Modified | Tue Jul. 08, 2003 13:09:12 GMT-0400 (Eastern Daylight Time) |
| Expires | Tue Jul. 08, 2003 13:34:35 GMT-0400 (Eastern Daylight Time) |
| HTTP Header | HTTP/1.0 200 OK |
| | Last-Modified: Wed, 13 Mar. 2002 21:19:25 GMT |
| | Accept-Ranges: bytes |
| | Server: Netscape-Enterprise/6.1 AOL |
| | Content-Type: image/gif |
| | Content-Length: 74 |
| | Surrogate-Server: AkamaiGHost, AkamaiGHost, AkamaiGHost |
| | Cache-Control: max-age = 1537 |
| | Expires: Tue, 08 Jul. 2003 17:36:07 GMT |
| | Date: Tue, 08 Jul. 2003 17:10:30 GMT | http://i.a.cnn.net/cnn/video/iraq/2003/07/08/ja.bagh-d.at.night.vs.cnn.jpg

| | |
|---|---|
| Size | 5388 |
| Binary | true |
| Blocking | false |
| Redirected to | |
| Modified | Tue Jul. 08, 2003 13:09:13 GMT-0400 (Eastern Daylight Time) |
| Expires | Tue Jul. 08, 2003 13:24:19 GMT-0400 (Eastern Daylight Time) |
| HTTP Header | HTTP/1.0 200 OK |
| | Server: Netscape-Enterprise/6.1 AOL |
| | Content-Type: image/jpeg |
| | Last-Modified: Tue, 08 Jul. 2003 05:48:35 GMT |
| | Content-Length: 5388 |
| | Accept-Ranges: bytes |
| | Cache-Control: max-age = 921 |
| | Date: Tue, 08 Jul. 2003 17:10:30 GMT |
| | Surrogate-Server: AkamaiGHost | http://i.a.cnn.net/cnn/.element/img/1.0/main/super-links/health.gif

| | |
|---|---|
| Size | 161 |
| Binary | true |
| Blocking | false |
| Redirected to | |
| Modified | Tue Jul. 08, 2003 13:09:13 GMT-0400 (Eastern Daylight Time) |
| Expires | Tue Jul. 08, 2003 13:32:16 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:25 GMT |
| | Content-Length: 161 |
| | Accept-Ranges: bytes |
| | Surrogate-Server: AkamaiGHost, AkamaiGHost |

-continued

| | |
|---|---|
| | Cache-Control: max-age = 1398 |
| | Date: Tue, 08 Jul. 2003 17:10:30 GMT | http://i.a.cnn.net/cnn/2003/HEALTH/07/08/otsc.gupta/tz.gupta.jpg

| | |
|---|---|
| Size | 3702 |
| Binary | true |
| Blocking | false |
| Redirected to | |
| Modified | Tue Jul. 08, 2003 13:09:14 GMT-0400 (Eastern Daylight Time) |
| Expires | Tue Jul. 08, 2003 13:34:28 GMT-0400 (Eastern Daylight Time) |
| HTTP Header | HTTP/1.0 200 OK |
| | Server: Netscape-Enterprise/6.1 AOL |
| | Content-Type: image/jpeg |
| | Last-Modified: Tue, 08 Jul. 2003 13:26:21 GMT |
| | Content-Length: 3702 |
| | Accept-Ranges: bytes |
| | Surrogate-Server: AkamaiGHost, AkamaiGHost |
| | Cache-Control: max-age = 1530 |
| | Date: Tue, 08 Jul. 2003 17:10:32 GMT | http://i.a.cnn.net/cnn/.element/img/1.0/main/at_cn-nmoney.gif

| | |
|---|---|
| Size | 559 |
| Binary | true |
| Blocking | false |
| Redirected to | |
| Modified | Tue Jul. 08, 2003 13:09:14 GMT-0400 (Eastern Daylight Time) |
| Expires | Tue Jul. 08, 2003 13:23:25 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:24 GMT |
| | Content-Length: 559 |
| | Accept-Ranges: bytes |
| | Cache-Control: max-age = 867 |
| | Date: Tue, 08 Jul. 2003 17:10:32 GMT |
| | Surrogate-Server: AkamaiGHost | http://i.a.cnn.net/cnn/.element/img/1.0/main/busi-ness.news.blue.gif

| | |
|---|---|
| Size | 169 |
| Binary | true |
| Blocking | false |
| Redirected to | |
| Modified | Tue Jul. 08, 2003 13:09:15 GMT-0400 (Eastern Daylight Time) |
| Expires | Tue Jul. 08, 2003 14:00:21 GMT-0400 (Eastern Daylight Time) |
| HTTP Header | HTTP/1.0 200 OK |

-continued

```
Server: Netscape-Enterprise/6.1 AOL
Content-Type: image/gif
Last-Modified: Mon, 09 Jun. 2003
  19:48:25 GMT
Content-Length: 169
Accept-Ranges: bytes
Cache-Control: max-age = 3083
Date: Tue, 08 Jul. 2003 17:10:33 GMT
Surrogate-Server: AkamaiGHost
``` http://ar.atwola.com/image/93103306/aol

| | |
|---|---|
| Size | 0 |
| Binary | true |
| Blocking | false |
| Redirected to | http://ar.atwola.com/content/B0/0/H7pTL2Luf0__kw3xmlj8W1sns8a9RRNke8__SAqLz-KBa609jmULHVa8jgFKtiL69KXTPCmjMkYOvM5C__xF3-lKNjRbUvMSjKyxE7A6B3LIHANk$/aol |
| Modified | Tue Jul. 08, 2003 13:09:00 GMT-0400 (Eastern Daylight Time) |
| Expires | Wed Dec. 31, 1969 19:00:00 GMT-0500 (Eastern Standard Time) |
| HTTP Header | HTTP/1.1 302 Found<br>Pragma: no-cache<br>Cache-Control: no-cache<br>Expires: Tue, 08 Jul. 2003 17:10:16 GMT<br>Location: http://ar.atwola.com/content/B0/0/H7pTL2Luf0__kw3xmlj8W1sns8a9RRNke8__SAqLz-KBa609jmULHVa8jgFKtiL69KXTPCmjMkYOvM5C__xF3-lKNjRbUvMSjKyxE7A6B3LIHANk$/aol<br>P3P: CP = "CUR TAI PSA UNI COM NAV STA NOI OUR"<br>Date: Tue, 08 Jul. 2003 17:10:16 GMT<br>Content-Length: 0 | http://ar.atwola.com/content/B0/0/
H7pTL2Luf0_kw3xmlj8W1sns8a9RRNke8_SAqLz-
KBa609jmULHVa8jgFKtiL69KXTPCmjMkYOv-
M5C_xF3lKNjRbUvMSjKyxE7A6B3LIHAN
k$/aol

| | |
|---|---|
| Size | 696 |
| Binary | false |
| Blocking | false |
| Redirected to | |
| Modified | Tue Jul. 08, 2003 13:09:05 GMT-0400 (Eastern Daylight Time) |
| Expires | Fri Jul. 11, 2003 13:09:00 GMT-0400 (Eastern Daylight Time) |
| HTTP Header | HTTP/1.1 200 OK<br>Last-Modified: Sat, 05 Jul. 2003 17:10:20 GMT<br>Expires: Fri, 11 Jul. 2003 17:10:20 GMT<br>Date: Tue, 08 Jul. 2003 17:10:20 GMT<br>Content-Length: 696<br>Content-Type: image/gif | http://i.cnn.net/cnn/.element/img/1.0/main/arrow_down.gif

| | |
|---|---|
| Size | 70 |
| Binary | true |
| Blocking | false |
| Redirected to | |
| Modified | Tue Jul. 08, 2003 13:09:02 GMT-0400 (Eastern Daylight Time) |
| Expires | Tue Jul. 08, 2003 13:09:02 GMT-0400 (Eastern Daylight Time) |
| HTTP Header | HTTP/1.0 200 OK<br>Server: Netscape-Enterprise/6.1 AOL<br>Date: Thu, 26 Jun. 2003 03:01:27 GMT<br>Content-Type: image/gif<br>Last-Modified: Mon, 09 Jun. 2003 19:48:24 GMT<br>Content-Length: 70<br>Accept-Ranges: bytes<br>Age: 1724<br>X-Cache: HIT from i.cnn.net | http://i.cnn.net/cnn/.element/img/1.0/main/arrow_up.gif

| | |
|---|---|
| Size | 70 |
| Binary | true |
| Blocking | false |
| Redirected to | |
| Modified | Tue Jul. 08, 2003 13:09:06 GMT-0400 (Eastern Daylight Time) |
| Expires | Tue Jul. 08, 2003 13:09:06 GMT-0400 (Eastern Daylight Time) |
| HTTP Header | HTTP/1.0 200 OK<br>Server: Netscape-Enterprise/6.1 AOL<br>Date: Sat, 21 Jun. 2003 05:12:01 GMT<br>Content-Type: image/gif<br>Last-Modified: Mon, 09 Jun. 2003 19:48:24 GMT<br>Content-Length: 70<br>Accept-Ranges: bytes<br>Age: 8558<br>X-Cache: HIT from i.cnn.net | http://i.a.cnn.net/cnn/.element/img/1.0/main/ftn.breaking.alerts.gif

| | |
|---|---|
| Size | 1919 |
| Binary | true |
| Blocking | false |
| Redirected to | |
| Modified | Tue Jul. 08, 2003 13:09:15 GMT-0400 (Eastern Daylight Time) |
| Expires | Tue Jul. 08, 2003 13:36:45 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 1919<br>Accept-Ranges: bytes<br>Cache-Control: max-age = 1667<br>Date: Tue, 08 Jul. 2003 17:10:33 GMT<br>Surrogate-Server: AkamaiGHost | http://i.a.cnn.net/cnn/.element/img/1.0/main/ftn.345x32.try.timeMay03.gif

| | |
|---|---|
| Size | 2035 |
| Binary | true |
| Blocking | false |
| Redirected to | |
| Modified | Tue Jul. 08, 2003 13:09:16 GMT-0400 (Eastern Daylight Time) |
| Expires | Tue Jul. 08, 2003 13:18:33 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 07 Jul. 2003 20:55:34 GMT<br>Content-Length: 2035<br>Accept-Ranges: bytes<br>Cache-Control: max-age = 575<br>Date: Tue, 08 Jul. 2003 17:10:33 GMT<br>Surrogate-Server: AkamaiGHost | http://i.a.cnn.net/cnn/.element/img/1.0/main/super-links/reports.gif

| | |
|---|---|
| Size | 170 |
| Binary | true |
| Blocking | false |
| Redirected to | |
| Modified | Tue Jul. 08, 2003 13:09:16 GMT-0400 (Eastern Daylight Time) |
| Expires | Tue Jul. 08, 2003 13:57:16 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 170<br>Accept-Ranges: bytes<br>Surrogate-Server: AkamaiGHost, AkamaiGHost<br>Cache-Control: max-age = 2898<br>Date: Tue, 08 Jul. 2003 17:10:34 GMT | http://i.a.cnn.net/cnn/images/programming.boxes/tz.machu.picchu.jpg

| | |
|---|---|
| Size | 1050 |
| Binary | true |
| Blocking | false |
| Redirected to | |
| Modified | Tue Jul. 08, 2003 13:09:16 GMT-0400 (Eastern Daylight Time) |
| Expires | Tue Jul. 08, 2003 13:19:50 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Mon, 07 Jul. 2003 20:35:45 GMT<br>Content-Length: 1050<br>Accept-Ranges: bytes<br>Cache-Control: max-age = 652<br>Date: Tue, 08 Jul. 2003 17:10:35 GMT<br>Surrogate-Server: AkamaiGHost | http://i.a.cnn.net/cnn/.element/img/1.0/main/super-links/technology.gif

| | |
|---|---|
| Size | 186 |
| Binary | true |
| Blocking | false |
| Redirected to | |
| Modified | Tue Jul. 08, 2003 13:09:17 GMT-0400 (Eastern Daylight Time) |
| Expires | Tue Jul. 08, 2003 13:22:12 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 186<br>Accept-Ranges: bytes<br>Cache-Control: max-age = 794<br>Date: Tue, 08 Jul. 2003 17:10:35 GMT<br>Surrogate-Server: AkamaiGHost | http://i.a.cnn.net/cnn/2003/TECH/ptech/07/08/pop-sci.ul.labs/tz.ul.lab.cnn.jpg

| | |
|---|---|
| Size | 1258 |
| Binary | true |
| Blocking | false |
| Redirected to | |
| Modified | Tue Jul. 08, 2003 13:09:17 GMT-0400 (Eastern Daylight Time) |
| Expires | Tue Jul. 08, 2003 13:25:42 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 13:47:23 GMT<br>Content-Length: 1258<br>Accept-Ranges: bytes<br>Cache-Control: max-age = 1004<br>Date: Tue, 08 Jul. 2003 17:10:35 GMT<br>Surrogate-Server: AkamaiGHost | http://i.a.cnn.net/cnn/.element/img/1.0/main/us.gif

| | |
|---|---|
| Size | 352 |
| Binary | true |
| Blocking | false |
| Redirected to | |
| Modified | Tue Jul. 08, 2003 13:09:17 GMT-0400 (Eastern Daylight Time) |
| Expires | Tue Jul. 08, 2003 13:25:22 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 352<br>Accept-Ranges: bytes<br>Cache-Control: max-age = 984<br>Date: Tue, 08 Jul. 2003 17:10:35 GMT<br>Surrogate-Server: AkamaiGHost | http://i.a.cnn.net/cnn/.element/img/1.0/main/world.gif

| | |
|---|---|
| Size | 456 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:57:41 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 456<br>Accept-Ranges: bytes<br>Cache-Control: max-age = 2923<br>Date: Tue, 08 Jul. 2003 17:10:36 GMT<br>Surrogate-Server: AkamaiGHost | http://i.cnn.net/cnn/.element/img/1.0/misc/icon.external.links.gif

| | |
|---|---|
| Size | 104 |
| Binary | true |
| Blocking | false |
| Redirected to | |
| Modified | Tue Jul. 08, 2003 13:09:09 GMT-0400 (Eastern Daylight Time) |
| Expires | Tue Jul. 08, 2003 13:09:09 GMT-0400 (Eastern Daylight Time) |
| HTTP Header | HTTP/1.0 200 OK<br>Server: Netscape-Enterprise/6.1 AOL<br>Date: Fri, 20 Jun. 2003 15:39:46 GMT<br>Content-Type: image/gif<br>Last-Modified: Mon, 09 Jun. 2003 19:48:26 GMT<br>Content-Length: 104<br>Accept-Ranges: bytes<br>Age: 11403<br>X-Cache: HIT from i.cnn.net | http://i.a.cnn.net/cnn/.element/img/1.0/main/technology.gif

| | |
|---|---|
| Size | 731 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:32:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 731<br>Accept-Ranges: bytes<br>Cache-Control: max-age = 1420<br>Date: Tue, 08 Jul. 2003 17:10:36 GMT<br>Surrogate-Server: AkamaiGHost | http://i.a.cnn.net/cnn/.element/img/1.0/main/entertainment.gif

| | |
|---|---|
| Size | 661 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:42:43 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 661<br>Accept-Ranges: bytes<br>Cache-Control: max-age = 2025<br>Date: Tue, 08 Jul. 2003 17:10:36 GMT<br>Surrogate-Server: AkamaiGHost | http://i.a.cnn.net/cnn/.element/img/1.0/main/politics.gif

| | |
|---|---|
| Size | 484 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:47:26 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 484<br>Accept-Ranges: bytes<br>Cache-Control: max-age = 2308<br>Date: Tue, 08 Jul. 2003 17:10:36 GMT<br>Surrogate-Server: AkamaiGHost | http://i.a.cnn.net/cnn/.element/img/1.0/main/law.gif

| | |
|---|---|
| Size | 394 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:59:39 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 394<br>Accept-Ranges: bytes<br>Cache-Control: max-age = 3041<br>Date: Tue, 08 Jul. 2003 17:10:37 GMT<br>Surrogate-Server: AkamaiGHost | http://i.a.cnn.net/cnn/.element/img/1.0/main/health.gif

| | |
|---|---|
| Size | 448 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:40:46 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 448<br>Accept-Ranges: bytes<br>Cache-Control: max-age = 1908<br>Date: Tue, 08 Jul. 2003 17:10:37 GMT<br>Surrogate-Server: AkamaiGHost | http://i.a.cnn.net/cnn/.element/img/1.0/main/space.gif

| | |
|---|---|
| Size | 914 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:28:53 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 914<br>Accept-Ranges: bytes<br>Surrogate-Server: AkamaiGHost, AkamaiGHost<br>Cache-Control: max-age = 1195<br>Date: Tue, 08 Jul. 2003 17:10:37 GMT | http://i.a.cnn.net/cnn/.element/img/1.0/main/travel.gif

| | |
|---|---|
| Size | 442 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:37:01 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 442<br>Accept-Ranges: bytes<br>Surrogate-Server: AkamaiGHost, AkamaiGHost |

-continued

| | |
|---|---|
| | Cache-Control: max-age = 1683<br>Date: Tue, 08 Jul. 2003 17:10:37 GMT | http://i.a.cnn.net/cnn/.element/img/1.0/main/education.gif

| | |
|---|---|
| Size | 536 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:16:18 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 536<br>Accept-Ranges: bytes<br>Cache-Control: max-age = 440<br>Date: Tue, 08 Jul. 2003 17:10:38 GMT<br>Surrogate-Server: AkamaiGHost | http://i.a.cnn.net/cnn/.element/img/1.0/main/sports.gif

| | |
|---|---|
| Size | 452 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 14:02:04 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 452<br>Accept-Ranges: bytes<br>Cache-Control: max-age = 3186<br>Date: Tue, 08 Jul. 2003 17:10:38 GMT<br>Surrogate-Server: AkamaiGHost | http://i.a.cnn.net/cnn/.element/img/1.0/main/business.gif

| | |
|---|---|
| Size | 515 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:19:24 GMT-0400 (Eastern Daylight Time) |
| HTTP Header | HTTP/1.0 200 OK<br>Server: Netscape-Enterprise/6.1 AOL<br>Content-Type: image/gif |

-continued

Last-Modified: Mon, 09 Jun. 2003
19:48:24 GMT
Content-Length: 515
Accept-Ranges: bytes
Surrogate-Server: AkamaiGHost,
AkamaiGHost
Cache-Control: max-age = 626
Date: Tue, 08 Jul. 2003 17:10:38 GMT http://i.a.cnn.net/cnn/.element/img/1.0/misc/diagonal.gif

| | |
|---|---|
| Size | 86 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:43:03 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:27 GMT<br>Content-Length: 86<br>Accept-Ranges: bytes<br>Cache-Control: max-age = 2045<br>Date: Tue, 08 Jul. 2003 17:10:38 GMT<br>Surrogate-Server: AkamaiGHost | http://i.a.cnn.net/cnn/.element/img/1.0/main/tv.schedule.gif

| | |
|---|---|
| Size | 161 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:19:12 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 161<br>Accept-Ranges: bytes<br>Cache-Control: max-age = 614<br>Date: Tue, 08 Jul. 2003 17:10:39 GMT<br>Surrogate-Server: AkamaiGHost | http://i.cnn.net/cnn/CNN/Programs/includes/showbox/images/paula.zahn.gif

| | |
|---|---|
| Size | 3762 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:09:09 GMT-0400 (Eastern Daylight Time) |
| HTTP Header | HTTP/1.0 200 OK<br>Server: Netscape-Enterprise/6.1 AOL<br>Date: Thu, 22 May 2003 22:29:24 GMT<br>Content-Type: image/gif<br>Last-Modified: Sun, 18 Aug. 2002 18:22:27 GMT<br>Content-Length: 3762<br>Accept-Ranges: bytes<br>Age: 67768<br>X-Cache: HIT from i.cnn.net | http://i.a.cnn.net/cnn/.element/img/1.0/main/superlinks/us.gif

| | |
|---|---|
| Size | 145 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:23:54 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 145<br>Accept-Ranges: bytes<br>Cache-Control: max-age = 896<br>Date: Tue, 08 Jul. 2003 17:10:39 GMT<br>Surrogate-Server: AkamaiGHost | http://i.a.cnn.net/cnn/2003/US/07/08/nyt.kristof.tz.blair.jpg

| | |
|---|---|
| Size | 4091 |
| Binary | true |
| Blocking | false |
| Redirected to | |
| Modified | Tue Jul. 08, 2003 13:09:22 GMT-0400 (Eastern Daylight Time) |
| Expires | Tue Jul. 08, 2003 13:56:56 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 15:48:13 GMT<br>Content-Length: 4091<br>Accept-Ranges: bytes<br>Cache-Control: max-age = 2878<br>Date: Tue, 08 Jul. 2003 17:10:39 GMT<br>Surrogate-Server: AkamaiGHost | http://i.a.cnn.net/cnn/.element/img/1.0/main/super-links/offbeat.gif

| | |
|---|---|
| Size | 171 |
| Binary | true |
| Blocking | false |
| Redirected to | |
| Modified | Tue Jul. 08, 2003 13:09:22 GMT-0400 (Eastern Daylight Time) |
| Expires | Tue Jul. 08, 2003 13:42:20 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 171<br>Accept-Ranges: bytes<br>Cache-Control: max-age = 2002<br>Date: Tue, 08 Jul. 2003 17:10:39 GMT<br>Surrogate-Server: AkamaiGHost | http://i.a.cnn.net/cnn/2003/US/Southwest/07/08/offbeat.editor.fired/tz.caddyshack.jpg

| | |
|---|---|
| Size | 2064 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:53:26 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 16:37:42 GMT<br>Content-Length: 2064<br>Accept-Ranges: bytes<br>Surrogate-Server: AkamaiGHost, AkamaiGHost<br>Cache-Control: max-age = 2667<br>Date: Tue, 08 Jul. 2003 17:10:40 GMT | http://i.a.cnn.net/cnn/.element/img/1.0/main/quick-vote.no.sponsor.gif

| | |
|---|---|
| Size | 1437 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:50:00 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 1437<br>Accept-Ranges: bytes<br>Surrogate-Server: AkamaiGHost, AkamaiGHost |

-continued

Cache-Control: max-age = 2461
Date: Tue, 08 Jul. 2003 17:10:41 GMT http://i.a.cnn.net/cnn/.element/img/1.0/main/icon_external.gif

| | |
|---|---|
| Size | 104 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:32:52 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 104<br>Accept-Ranges: bytes<br>Cache-Control: max-age = 1433<br>Date: Tue, 08 Jul. 2003 17:10:41 GMT<br>Surrogate-Server: AkamaiGHost | http://i.a.cnn.net/cnn/.element/img/1.0/main/partner_time.gif

| | |
|---|---|
| Size | 439 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:48:52 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 439<br>Accept-Ranges: bytes<br>Cache-Control: max-age = 2393<br>Date: Tue, 08 Jul. 2003 17:10:42 GMT<br>Surrogate-Server: AkamaiGHost | http://i.a.cnn.net/cnn/.element/img/1.0/main/partner_si.gif

| | |
|---|---|
| Size | 973 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:25:00 GMT-0400 (Eastern Daylight Time) |
| HTTP Header | HTTP/1.0 200 OK<br>Server: Netscape-Enterprise/6.1 AOL<br>Content-Type: image/gif |

-continued

```
                Last-Modified: Mon, 09 Jun. 2003
                19:48:25 GMT
                Content-Length: 973
                Accept-Ranges: bytes
                Cache-Control: max-age = 961
                Date: Tue, 08 Jul. 2003 17:10:42 GMT
                Surrogate-Server: AkamaiGHost
``` http://i.a.cnn.net/cnn/.element/img/1.0/main/partner_fortune.gif

```
Size            938
Binary          true
Blocking        false
Redirected to
Modified        Tue Jul. 08, 2003 13:09:24 GMT-0400 (Eastern
                Daylight Time)
Expires         Tue Jul. 08, 2003 13:25:29 GMT-0400 (Eastern
                Daylight Time)
HTTP Header     HTTP/1.0 200 OK
                Server: Netscape-Enterprise/6.1 AOL
                Content-Type: image/gif
                Last-Modified: Mon, 09 Jun. 2003
                19:48:26 GMT
                Content-Length: 938
                Accept-Ranges: bytes
                Surrogate-Server: AkamaiGHost,
                AkamaiGHost, AkamaiGHost
                Cache-Control: max-age = 990
                Date: Tue, 08 Jul. 2003 17:10:42 GMT
``` http://i.a.cnn.net/cnn/.element/img/1.0/sect/SEARCH/dotted.line.gif

```
Size            69
Binary          true
Blocking        false
Redirected to
Modified        Tue Jul. 08, 2003 13:09:24 GMT-0400 (Eastern
                Daylight Time)
Expires         Tue Jul. 08, 2003 13:23:14 GMT-0400 (Eastern
                Daylight Time)
HTTP Header     HTTP/1.0 200 OK
                Server: Netscape-Enterprise/6.1 AOL
                Content-Type: image/gif
                Last-Modified: Mon, 09 Jun. 2003
                19:48:28 GMT
                Content-Length: 69
                Accept-Ranges: bytes
                Cache-Control: max-age = 855
                Date: Tue, 08 Jul. 2003 17:10:42 GMT
                Surrogate-Server: AkamaiGHost
``` http://i.a.cnn.net/cnn/.element/img/1.0/misc/icon.external.links.gif

```
Size            104
Binary          true
Blocking        false
Redirected to
Modified        Tue Jul. 08, 2003 13:09:24 GMT-0400 (Eastern
                Daylight Time)
Expires         Tue Jul. 08, 2003 13:50:35 GMT-0400 (Eastern
                Daylight Time)
HTTP Header     HTTP/1.0 200 OK
                Server: Netscape-Enterprise/6.1 AOL
                Content-Type: image/gif
                Last-Modified: Mon, 09 Jun. 2003
                19:48:26 GMT
                Content-Length: 104
                Accept-Ranges: bytes
                Cache-Control: max-age = 2496
                Date: Tue, 08 Jul. 2003 17:10:43 GMT
                Surrogate-Server: AkamaiGHost
``` http://ar.atwola.com/html/93103308/48441749/aol?SNM=HIDBFV&width=88&height=31&target=_top&TZ=240&TVAR=class%3Dus.low&CT=I

```
Size            377
Binary          false
Blocking        false
Redirected to
Modified        Tue Jul. 08, 2003 13:09:01 GMT-0400 (Eastern
                Daylight Time)
Expires         Wed Dec 31 1969 19:00:00 GMT-0500
                (Eastern Standard Time)
HTTP Header     HTTP/1.1 200 OK
                Content-Type: text/html
                Pragma: no-cache
                Cache-Control: no-cache
                Expires: Tue, 08 Jul. 2003 17:10:16
                GMT
                Date: Tue, 08 Jul. 2003 17:10:16 GMT
                Content-Length: 377
``` http://i.a.cnn.net/cnn/.element/img/1.0/main/icon_premium.gif

```
Size            74
Binary          true
Blocking        false
Redirected to
Modified        Tue Jul. 08, 2003 13:09:24 GMT-0400 (Eastern
                Daylight Time)
Expires         Tue Jul. 08, 2003 13:37:32 GMT-0400 (Eastern
                Daylight Time)
HTTP Header     HTTP/1.0 200 OK
                Server: Netscape-Enterprise/6.1 AOL
                Content-Type: image/gif
                Last-Modified: Mon, 09 Jun. 2003
                19:48:24 GMT
                Content-Length: 74
                Accept-Ranges: bytes
                Cache-Control: max-age = 1713
                Date: Tue, 08 Jul. 2003 17:10:43 GMT
                Surrogate-Server: AkamaiGHost
``` http://ar.atwola.com/html/93137910/48441749/
aol?SNM=HIDBFV&width=101&height=1&
target=_top&TZ=240&TVAR=class%3Dus.low&
CT=J&hw=docw

| | |
|---|---|
| Size | 267 |
| Binary | false |
| Blocking | true |
| Redirected to | |
| Modified | Tue Jul. 08, 2003 13:09:02 GMT-0400 (Eastern Daylight Time) |
| Expires | Wed Dec. 31, 1969 19:00:00 GMT-0500 (Eastern Standard Time) |
| HTTP Header | HTTP/1.1 200 OK |
| | Content-Type: application/x-javascript |
| | Pragma: no-cache |
| | Cache-Control: no-cache |
| | Expires: Tue, 08 Jul. 2003 17:10:19 GMT |
| | Date: Tue, 08 Jul. 2003 17:10:19 GMT |
| | Content-Length: 267 | http://ar.atwola.com/file/adsEnd.js

| | |
|---|---|
| Size | 1551 |
| Binary | false |
| Blocking | true |
| Redirected to | |
| Modified | Tue Jul. 08, 2003 13:09:11 GMT-0400 (Eastern Daylight Time) |
| Expires | Wed Jul. 09, 2003 13:09:02 GMT-0400 (Eastern Daylight Time) |
| HTTP Header | HTTP/1.1 200 OK |
| | Expires: Wed, 09 Jul. 2003 17:10:27 GMT |
| | Date: Tue, 08 Jul. 2003 17:10:27 GMT |
| | Content-Length: 1551 |
| | Content-Type: application/x-javascript | http://www.cnn.com/cookie.crumb

| | |
|---|---|
| Size | 43 |
| Binary | true |
| Blocking | false |
| Redirected to | |
| Modified | Tue Jul. 08, 2003 13:09:14 GMT-0400 (Eastern Daylight Time) |
| Expires | Wed Dec. 31, 1969 19:00:00 GMT-0500 (Eastern Standard Time) |
| HTTP Header | HTTP/1.1 200 OK |
| | Server: Netscape-Enterprise/6.1 AOL |
| | Date: Tue, 08 Jul. 2003 17:10:31 GMT |
| | Content-Length: 43 |
| | Content-Type: image/gif |

Links

| URL | Total Score |
|---|---|
| | |

Results

| Dialup Blocking Total | Cable Blocking Total | Satellite Blocking Total |
|---|---|---|
| First Visit | First Visit | First Visit |
| 1.32 5.17 | 0.76 2 | 1.8 13.18 |
| Second Visit | Second Visit | Second Visit |
| 1.32 5.13 | 0.76 1.98 | 1.8 13.02 |

Because each example report uses the same Perception Time value of ten seconds, these reports imply that that it takes a Dialup visitor approximately 50 seconds to load CNN the first time, a Cable visitor 20 seconds and a Satellite visitor over 130 seconds.

These reports also indicate that for visitors who only visit CNN once per day, caching provides no benefit for their first visit of the day.

Heuristics Description

The Web page scoring tool uses the time to perform DNS lookups, round trip time for requests, download size and bandwidth and the blocking nature of external CSS and JavaScript files to determine a calculated download time. This download time is scaled by the Visitor Perception Time parameter to determine a score.

FIGS. 2a-2l illustrate a Web page report according to the invention. The report shown in FIGS. 2a-2l was generated for the Web page http://slashdot.org/ and is readily contrasted by a report generated by a state of the art product, as shown in FIGS. 1a-c, for the same Web page. As shown on FIG. 2a, a total score 21 is provided for a Web page. The total score is followed a score details 22, which include an incremental layout score 23 and a latency score 24. The report provides download scores 25, documents statistics 26, 27, details of the document Head 28 and details of the body tag 29. As well, the invention also provides details of the child elements of the body tag 30, which are organized as a series of tables, one table for each child element, where each table contain information regards the child element key, dataSize, fetchCount, lastFetched date, lastModified date, expirationTime, and responseHead.

While the report shown in FIGS. 2a-2l includes the various factors identified above, those skilled in the art will appreciate that the invention may provide reports in any other format as desired, including such factors as may be of interest.

Figure 3B:
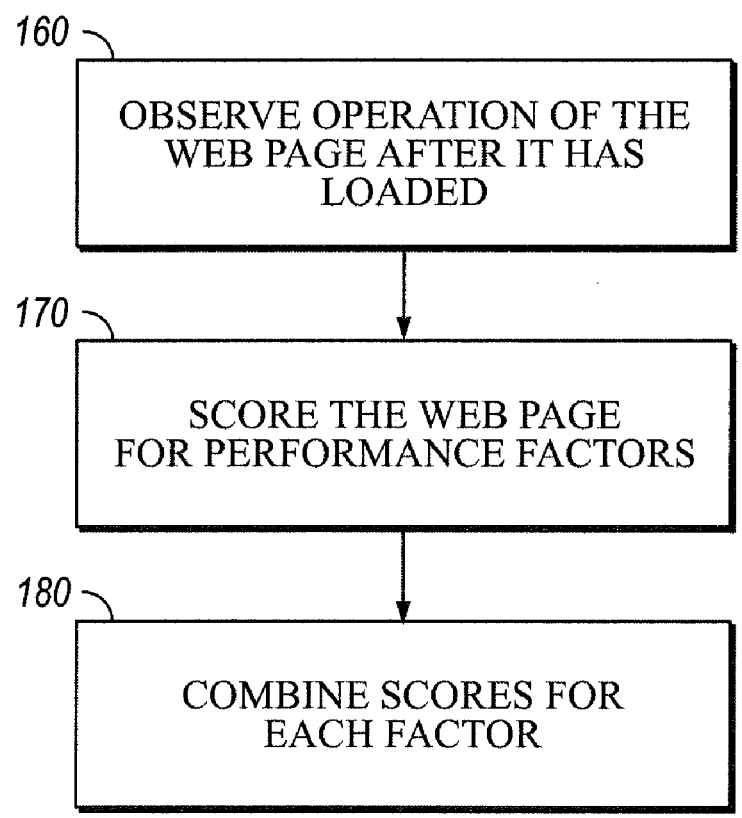

FIGS. 3a and 3b provide a flow diagram of a method for Web page performance scoring using a browser-based tool according to the invention. The presently preferred embodiment of the invention comprises a browser-based tool that loads a Web page (100), accesses the document object model (DOM) of the page (110), collects information about the page structure (120), and determines through the use of heuristics such factors as how much text is found on the page, download time, and the like (130), produces a statistical breakdown of the page (140), and calculates a score based on performance of the page relative to an ideal performance score (150).

Key to the operation of the invention is the ability to observe operation of the Web page in real time as it is loading, further determine performance after a second (cached) load (160), score the page for several of various performance factors (170), and produce a combined score for the various factors (180).

One presently preferred embodiment of the invention comprises a tool that has been implemented as a special Web page hosted in a Netscape 7.0x/Mozilla (see http://channels.netscape.com/ns/browsers/default.jsp) sidebar. The tool uses a JavaScript™, see http://devedge.netscape.com/central/javascript/ (ECMAScript—see http://www.ecma-international.org/publications/standards/ECMA-262.HTM: Standard Ecma-262 ECMAScript Language Specification 3rd edition (December 1999)), standards based mechanism for access to the Web page document structure by means of the W3C DOM (see http://www.w3.org/DOM/) application programming interface, as well as access to internal services exposed by the Netscape 7/Mozilla browser to access file cache and size information.

The tool is readily extended to operate using Netscape 7/Mozilla in batch mode for automated reporting. Implementations in Perl (see http://www.perl.com/) are also currently being considered.

Further, those skilled in the art will appreciate that any other browser, e.g. Microsoft's Internet Explorer, may be used in connection with the invention disclosed herein. Thus, the tool is readily implemented in different environments if the following components normally found in a Web browser are available:

An HTML/XML Parser

A JavaScript engine

Representation of the input document as an object model such as the W3C Document Object Model Ability to determine HTTP headers returned by the Web server and effective file caching for the Web page and the Web page referenced files.

Although the invention is described herein with reference to the preferred embodiment, one skilled in the art will readily appreciate that other applications may be substituted for those set forth herein without departing from the spirit and scope of the present invention. For example, the invention allows the scoring of cached vs. uncached versions of a page. Additionally, the invention is readily implemented in a system the does not comprise a browser, e.g. in PERL, etc. It is also possible to operate the invention such that it runs without user interaction and observation, for example on a server.

Accordingly, the invention should only be limited by the Claims included below.

The invention claimed is:

1. An apparatus for dynamic Web page performance scoring, comprising a processor programmed for providing:
   a tool for accessing Web page structure in connection with the real time loading, display, and operation of a Web page;
   said tool comprising a module for analyzing a plurality of Web page performance factors related to said Web page while said Web page is running;
   said tool comprising a module for receiving information about said Web page that is generated while analyzing said Web page performance factors;
   said tool comprising a heuristic mechanism for calculating a performance sub-score for each of performance factors;
   said tool comprising a module for combining said performance sub-scores for said performance factors to produce at least one interpretable Web page performance score;
   said heuristic mechanism calculating any of how much text is found on a page, number of domains, and outside files; producing a statistical breakdown of said page; and calculating a score based on performance of said page; and
   a processor programmed to provide a module for calculating a score which measures potential page load performance of pages in a Web site for visitors with varying network performance characteristics.

2. The apparatus of claim 1, said tool comprising a browser-based tool.

3. The apparatus of claim 1, said tool comprising a module for loading a Webpage, accessing a document object model (DOM) of said page, collecting information about page structure and parsing said page.

4. The apparatus of claim 1, said tool comprising a module for measuring relative performance of Web pages interactively as they are being developed.

5. The apparatus of claim 1, said tool comprising a process control measurement tool, which is run automatically, to determine performance scores for an entire Web site.

6. The apparatus of claim 1, wherein said tool visits any of a single page and all pages linked from a page up to a specified depth, while providing scores, overall statistics, and details for each included file.

7. The apparatus of claim 1, comprising a module for scoring of cached vs. uncached versions of a page.

8. The apparatus of claim 1, said heuristic mechanism using user data, connection data, and DOM data for generate a first-load and second-load score for a browser.

9. A computer implemented method for dynamic Web page performance scoring, comprising the steps of:
   loading a Web page;
   accessing said Web page structure in connection with the real time loading, display, and operation of said Web page;
   collecting information relating to a plurality of Web page performance factors in connection with the real time loading, display, and operation of said Web page; calculating a performance sub-score for each of said performance factors with a heuristic mechanism;
   using said collected information to calculate at least one interpretable Web page performance score;
   said heuristic mechanism calculating any of how much text is found on a page, number of domains, and outside files; producing a statistical breakdown of said page; and calculating a score based on performance of said page; and
   calculating a score which measures potential page load performance of pages in a Web site for visitors with varying network performance characteristics.

10. The method of claim 9, said method implementing a tool comprising a browser-based tool.

11. The method of claim 9, comprising the steps of:
   loading a Web page;
   accessing a document object model (DOM) of said page; and
   collecting information about page structure and parsing said page.

12. The method of claim 9, comprising the step of:
   measuring relative performance of Web pages interactively as they are being developed.

13. The method of claim 9, comprising the step of:
providing a process control measurement tool, which is run automatically, to determine performance scores for an entire Web site.

14. The method of claim 9, wherein said tool visits any of a single page and all pages linked from a page up to a specified depth, while providing scores overall statistics, and details for each included file.

15. The method of claim 9, comprising the step of scoring of cached vs. uncached versions of a page.

16. The method of claim 9, wherein said heuristic mechanism uses user data, connection data, and DOM data for generate a first-load and second-load score for a browser.

* * * * *